United States Patent
He et al.

(10) Patent No.: US 12,028,795 B2
(45) Date of Patent: Jul. 2, 2024

(54) POWER EFFICIENT RELAY DISCOVERY PROCEDURE FOR SIDELINK

(71) Applicant: QUALCOMM Incorporated, San Diego, CA (US)

(72) Inventors: Linhai He, San Diego, CA (US); Yi Huang, San Diego, CA (US); Seyedkianoush Hosseini, San Diego, CA (US); Gavin Bernard Horn, La Jolla, CA (US); Yongjun Kwak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/512,441

(22) Filed: Oct. 27, 2021

(65) Prior Publication Data

US 2022/0141757 A1 May 5, 2022

Related U.S. Application Data

(60) Provisional application No. 63/108,784, filed on Nov. 2, 2020.

(51) Int. Cl.
*H04W 48/14* (2009.01)
*H04W 4/02* (2018.01)
(Continued)

(52) U.S. Cl.
CPC .......... *H04W 48/14* (2013.01); *H04W 4/023* (2013.01); *H04W 52/0216* (2013.01); *H04W 88/04* (2013.01)

(58) Field of Classification Search
CPC . H04W 48/14; H04W 88/04; H04W 52/0216; H04W 4/023; H04W 72/25
See application file for complete search history.

(56) References Cited

U.S. PATENT DOCUMENTS

| | | | |
|---|---|---|---|
| 2014/0051450 A1* | 2/2014 | Tomita | H04W 36/38 455/439 |
| 2016/0128116 A1* | 5/2016 | Kim | H04W 4/021 370/329 |

(Continued)

FOREIGN PATENT DOCUMENTS

| | | | | |
|---|---|---|---|---|
| JP | 2016536858 A | * | 11/2016 | ............. H04W 4/90 |

OTHER PUBLICATIONS

International Search Report and Written Opinion—PCT/US2021/072069—ISA/EPO—dated Apr. 19, 2022.
(Continued)

*Primary Examiner* — Keith Ferguson
(74) *Attorney, Agent, or Firm* — Holland & Hart LLP

(57) ABSTRACT

Methods, systems, and devices for wireless communications are described. A user equipment (UE) may implement a power-efficient discovery procedure to establish a relay. In some cases, the UE may monitor a resource pool for a relay beacon from a relay device and measure a received power of the relay beacon. If the received power satisfies a threshold, the UE may monitor for a relay announcement from the relay device and establish a sidelink connection with the relay device based on the relay announcement. The relay beacon may support a two-stage discovery procedure, where the UE determines a relay device is available before processing a relay announcement to conserve power. Additional techniques for proximity-based discovery are described herein.

27 Claims, 13 Drawing Sheets

(51) Int. Cl.
*H04W 52/02* (2009.01)
*H04W 88/04* (2009.01)

(56) References Cited

U.S. PATENT DOCUMENTS

| | | | |
|---|---|---|---|
| 2016/0302250 A1* | 10/2016 | Sheng | H04W 76/14 |
| 2017/0317740 A1 | 11/2017 | Basu et al. | |
| 2019/0090228 A1* | 3/2019 | Zhang | H04W 4/80 |

OTHER PUBLICATIONS

Apple, et al., "Discussion on NR Sidelink Relay Discovery", 3GPP Draft, 3GPP TSG-RAN WG2 Meeting #111e, R2-2007098, 3rd Generation Partnership Project (3GPP), Mobile Competence Centre, 650, Route Des Lucioles, F-06921 Sophia-Antipolis Cedex, France, vol. RAN WG2, No. Online, Aug. 17, 2020-Aug. 28, 2020, Aug. 7, 2020 (Aug. 7, 2020), XP051911924, 4 Pages, Retrieved from the Internet: URL: https://ftp.3gpp.org/tsg_ran/WG2_RL2/TSGR2_111-e/Docs/R2-2007098.zip R2-2007098 SL Relay Discovery_v1.doc [Retrieved on Aug. 7, 2020] The Whole Document.

Ericsson: "Remaining Aspects for Discovery", 3GPP Draft, 3GPP TSG-RAN WG2 #112e, R2-2009228, 3rd Generation Partnership Project (3GPP), Mobile Competence Centre, 650, Route Des Lucioles, F-06921 Sophia-Antipolis Cedex, France, vol. RAN WG2, No. Electronic Meeting, Nov. 2, 2020-Nov. 13, 2020, Oct. 22, 2020 (Oct. 22, 2020), XP051941275, 6 Pages, Retrieved from the Internet: URL: https://ftp.3gpp.org/tsg_ran/WG2_RL2/TSGR2_112-e/Docs/R2-2009228.zip R2-2009228—Remaining Aspects for Discovery.docx [Retrieved on Oct. 22, 2020], The Whole Document.

Mediatek Inc: "Initiation of Relaying Operation", 3GPP Draft, 3GPP TSG-RAN WG2 Meeting #111 electronic, R2-2006573, 3rd Generation Partnership Project (3GPP), Mobile Competence Centre, 650, Route Des Lucioles, F-06921 Sophia-Antipolis Cedex, France, vol. RAN WG2, No. electronic, Aug. 17, 2020-Aug. 28, 2020, Aug. 7, 2020 (Aug. 7, 2020), XP051911516, 8 Pages, Retrieved from the Internet: URL: https://ftp.3gpp.org/tsg_ran/WG2_RL2/TSGR2_111-e/Docs/R2-2006573.zip R2-2006573.docx [Retrieved on Aug. 7, 2020], The Whole Document.

Partial International Search Report—PCT/US2021/072069—ISA/EPO—dated Feb. 24, 2022.

Qualcomm Incorporated: "Discussion on Relay Discovery Model/Procedure", 3GPP Draft, 3GPP TSG RAN WG2 Meeting #111-e, R2-2006556, 3rd Generation Partnership Project (3GPP), Mobile Competence Centre, 650, Route Des Lucioles, F-06921 Sophia-Antipolis Cedex, France, vol. RAN WG2, No. E-Conference, Aug. 17, 2020-Aug. 28, 2020, Aug. 7, 2020 (Aug. 7, 2020), XP051911499, 6 Pages, Retrieved from the Internet: URL: https://ftp.3gpp.org/tsg_ran/WG2_RL2/TSGR2_111-e/Docs/R2-2006556.zip R2-2006556—Discussion on Relay Discovery.doc [Retrieved on Aug. 7, 2020], The Whole Document.

Qualcomm Incorporated: "Discussion on Remaining Issues of Discovery and Relay (re) Selection", 3GPP Draft, 3GPP TSG RAN WG2 Meeting #112-e, R2-2008965, 3rd Generation Partnership Project (3GPP), Mobile Competence Centre, 650, Route Des Lucioles, F-06921 Sophia-Antipolis Cedex, France, vol. RAN WG2, No. E-Conference, Nov. 2, 2020-Nov. 13, 2020, Oct. 23, 2020 (Oct. 23, 2020), XP051942015, 8 Pages, Retrieved from the Internet: URL: https://ftp.3gpp.org/tsg_ran/WG2_RL2/TSGR2_112-e/Docs/R2-2008965.zip R2-2008965—Discussion on Remaining Issues of Discovery and Relay (re) Selection.doc [Retrieved on Oct. 23, 2020], The Whole Document.

ZTE Corporation, et al., "Discussion on Relay Discovery and Link Management", 3GPP Draft, 3GPP TSG-RAN WG2 Meeting #111 electronic, R2-2006738, 3rd Generation Partnership Project (3GPP), Mobile Competence Centre, 650, Route Des Lucioles, F-06921 Sophia-Antipolis Cedex, France, vol. RAN WG2, No. electronic, Aug. 17, 2020-Aug. 28, 2020, Aug. 7, 2020 (Aug. 7, 2020), XP051911646, 4 Pages, Retrieved from the Internet: URL: https://ftp.3gpp.org/tsg_ran/WG2_RL2/TSGR2_111-e/Docs/R2-2006738.zip. R2-2006738 Discussion on Relay Discovery and Link Management.doc [Retrieved on Aug. 7, 2020] The Whole Document.

* cited by examiner

POWER EFFICIENT RELAY DISCOVERY PROCEDURE FOR SIDELINK

CROSS REFERENCE

The present Application for Patent claims the benefit of U.S. Provisional Patent Application No. 63/108,784 by H E et al., entitled "POWER EFFICIENT RELAY DISCOVERY PROCEDURE FOR SIDELINK," filed Nov. 2, 2020, assigned to the assignee hereof, and expressly incorporated by reference herein.

FIELD OF TECHNOLOGY

The following relates to wireless communications, including power efficient relay discovery procedure for sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support power efficient relay discovery procedure for sidelink. A user equipment (UE) may implement a two-stage discovery procedure which implements a relay beacon. For a two-stage discovery procedure, the UE may first detect a suitable relay device, then the UE may perform processing to establish a relay connection. In the first stage, a UE may monitor for the relay beacon, which may be periodically broadcast by a relay device. If the relay beacon satisfies a relay selection criterion, the UE may perform the second stage of the discovery procedure. For example, the UE may perform the second stage if a measured power of the detected relay beacon exceeds a threshold. In the second stage, the UE may monitor for a relay announcement from the relay device and attempt to establish the relay connection. In some examples, the relay device may include an indication of a resource for the relay announcement in the relay beacon. The UE may then monitor the resource indicated by the relay beacon for the relay announcement. In some other examples, the UE may transmit a relay discovery request to the relay device, and the relay device may then transmit the relay announcement to the UE. Based on the information in the relay announcement, the UE may determine whether to establish a sidelink connection with the relay device.

Some additional techniques for proximity-based discovery are described herein. For example, a UE may initiate a discovery procedure based on proximity to one or more nearby relay devices. A UE may maintain a database of relay devices and use positioning information of the relay devices and the UE to determine if a relay device is nearby. In some cases, the UE may be configured with positioning information for the candidate relay devices, and in some cases the UE may determine and record the positioning information for the candidate relay devices. In some additional, or alternative, aspects, a UE may support both a passive discovery mode and an active discovery mode. In the passive mode, the UE may passively search for relay beacons, relay announcements, or both. In the active mode, the UE may periodically transmit a sidelink connection request in an attempt to establish a sidelink connection. In some examples, a base station may configure a UE to use a certain discovery mode. In other examples, the UE may first operate in passive mode and switch to active mode under certain conditions. For example, the UE may switch to the active mode if the UE fails to find a relay after a period of passive discovery, or if the UE has delay-sensitive or high-priority data to send or receive.

A method for wireless communications at a UE is described. The method may include monitoring a resource pool for a relay beacon from a relay device, detecting the relay beacon in the resource pool, receiving a relay announcement from the relay device based on the relay beacon satisfying a relay selection criterion, and establishing a sidelink connection with the relay device based on the relay announcement.

An apparatus for wireless communications at a UE is described. The apparatus may include a processor, memory coupled with the processor, and instructions stored in the memory. The instructions may be executable by the processor to cause the apparatus to monitor a resource pool for a relay beacon from a relay device, detect the relay beacon in the resource pool, receive a relay announcement from the relay device based on the relay beacon satisfying a relay selection criterion, and establish a sidelink connection with the relay device based on the relay announcement.

Another apparatus for wireless communications at a UE is described. The apparatus may include means for monitoring a resource pool for a relay beacon from a relay device, means for detecting the relay beacon in the resource pool, means for receiving a relay announcement from the relay device based on the relay beacon satisfying a relay selection criterion, and means for establishing a sidelink connection with the relay device based on the relay announcement.

A non-transitory computer-readable medium storing code for wireless communications at a UE is described. The code may include instructions executable by a processor to monitor a resource pool for a relay beacon from a relay device, detect the relay beacon in the resource pool, receive a relay announcement from the relay device based on the relay beacon satisfying a relay selection criterion, and establish a sidelink connection with the relay device based on the relay announcement.

Some examples of the method, apparatuses, and non-transitory computer-readable medium described herein may further include operations, features, means, or instructions for transmitting, to the relay device, a relay discovery request based on the relay beacon satisfying the relay selection criterion, where receiving the relay announcement may be based on transmitting the relay discovery request.

Some examples of the method, apparatuses, and non-transitory computer-readable medium described herein may further include operations, features, means, or instructions for identifying a set of resources associated with the relay announcement based on the relay beacon from the relay device, where receiving the relay announcement includes monitoring the set of resources associated with the relay announcement.

In some examples of the method, apparatuses, and non-transitory computer-readable medium described herein, the set of resources may be preconfigured at the UE or dedicated for relay messages, or both.

In some examples of the method, apparatuses, and non-transitory computer-readable medium described herein, the set of resources correspond to a subset of resource blocks of a resource pool configured for the UE.

In some examples of the method, apparatuses, and non-transitory computer-readable medium described herein, the set of resources associated with the relay announcement may be in a different resource pool than the resource pool for the relay beacon, a different slot than the relay beacon, or both.

In some examples of the method, apparatuses, and non-transitory computer-readable medium described herein, the set of resources may be configured for a set of multiple UEs including at least the UE.

In some examples of the method, apparatuses, and non-transitory computer-readable medium described herein, the relay selection criterion may be based on a received power of the relay beacon satisfying a proximity threshold, a proximity of the relay device satisfying a proximity threshold, and the proximity of the relay device may be determined based on the relay beacon, or any combination thereof.

Some examples of the method, apparatuses, and non-transitory computer-readable medium described herein may further include operations, features, means, or instructions for decoding the relay beacon based on an identifier which may be common to a set of multiple relay devices including the relay device.

Some examples of the method, apparatuses, and non-transitory computer-readable medium described herein may further include operations, features, means, or instructions for receiving, from a base station, one or more sequences associated with the set of multiple relay devices, the one or more sequences including at least the sequence.

Some examples of the method, apparatuses, and non-transitory computer-readable medium described herein may further include operations, features, means, or instructions for decoding the relay beacon based on an identifier or a code associated with relay discovery.

In some examples of the method, apparatuses, and non-transitory computer-readable medium described herein, the identifier may be an identifier of the relay device or an identifier associated with relay discovery.

Some examples of the method, apparatuses, and non-transitory computer-readable medium described herein may further include operations, features, means, or instructions for identifying a payload of the relay beacon, where the payload includes an identifier of the relay device.

Some examples of the method, apparatuses, and non-transitory computer-readable medium described herein may further include operations, features, means, or instructions for identifying unified access control information associated with the relay device, where the establishing the sidelink connection may be based on the unified access control information.

In some examples of the method, apparatuses, and non-transitory computer-readable medium described herein, the relay announcement includes the unified access control information.

In some examples of the method, apparatuses, and non-transitory computer-readable medium described herein, the sidelink connection may be established based on the UE meeting criteria associated with the unified access control information.

A method for wireless communications at a relay device is described. The method may include transmitting a relay beacon using a resource pool, transmitting a relay announcement based on transmitting the relay beacon, and establishing a sidelink connection with a UE based on the relay announcement.

An apparatus for wireless communications at a relay device is described. The apparatus may include a processor, memory coupled with the processor, and instructions stored in the memory. The instructions may be executable by the processor to cause the apparatus to transmit a relay beacon using a resource pool, transmit a relay announcement based on transmitting the relay beacon, and establish a sidelink connection with a UE based on the relay announcement.

Another apparatus for wireless communications at a relay device is described. The apparatus may include means for transmitting a relay beacon using a resource pool, means for transmitting a relay announcement based on transmitting the relay beacon, and means for establishing a sidelink connection with a UE based on the relay announcement.

A non-transitory computer-readable medium storing code for wireless communications at a relay device is described. The code may include instructions executable by a processor to transmit a relay beacon using a resource pool, transmit a relay announcement based on transmitting the relay beacon, and establish a sidelink connection with a UE based on the relay announcement.

Some examples of the method, apparatuses, and non-transitory computer-readable medium described herein may further include operations, features, means, or instructions for receiving, from the UE, a relay discovery request, where the transmitting the relay announcement may be based on receiving the relay discovery request.

Some examples of the method, apparatuses, and non-transitory computer-readable medium described herein may further include operations, features, means, or instructions for indicating a set of resources associated with the relay announcement based on the relay beacon, where transmitting the relay announcement includes transmitting the relay announcement using the set of resources.

In some examples of the method, apparatuses, and non-transitory computer-readable medium described herein, the set of resources may be preconfigured for the UE or dedicated for relay messages, or both.

In some examples of the method, apparatuses, and non-transitory computer-readable medium described herein, the set of resources correspond to a subset of resource blocks of a resource pool configured for the UE.

In some examples of the method, apparatuses, and non-transitory computer-readable medium described herein, the set of resources associated with the relay announcement may be in a different resource pool than the resource pool for the relay beacon, a different slot than the relay beacon, or both.

In some examples of the method, apparatuses, and non-transitory computer-readable medium described herein, the set of resources may be configured for a set of multiple UEs including at least the UE.

Some examples of the method, apparatuses, and non-transitory computer-readable medium described herein may further include operations, features, means, or instructions for encoding the relay beacon based on an identifier which may be common to a set of multiple relay devices including the relay device.

In some examples of the method, apparatuses, and non-transitory computer-readable medium described herein, the relay beacon may be scrambled with the sequence.

Some examples of the method, apparatuses, and non-transitory computer-readable medium described herein may further include operations, features, means, or instructions for scrambling the relay beacon based on an identifier of the relay device or an identifier associated with relay discovery.

Some examples of the method, apparatuses, and non-transitory computer-readable medium described herein may further include operations, features, means, or instructions for including an identifier of the relay device in a payload of the relay beacon.

Some examples of the method, apparatuses, and non-transitory computer-readable medium described herein may further include operations, features, means, or instructions for indicating unified access control information associated with the relay device to the UE, where the establishing the sidelink connection may be based on the unified access control information.

In some examples of the method, apparatuses, and non-transitory computer-readable medium described herein, the relay announcement includes the unified access control information.

In some examples of the method, apparatuses, and non-transitory computer-readable medium described herein, the sidelink connection may be established based on the UE meeting criteria associated with the unified access control information.

A method for wireless communications at a UE is described. The method may include identifying a set of candidate relay devices to establish a sidelink connection with the UE, receiving a relay announcement from a relay device based on a first positioning information for the relay device and a second positioning information for the UE, and establishing the sidelink connection with the relay device based on the relay announcement.

An apparatus for wireless communications at a UE is described. The apparatus may include a processor, memory coupled with the processor, and instructions stored in the memory. The instructions may be executable by the processor to cause the apparatus to identify a set of candidate relay devices to establish a sidelink connection with the UE, receive a relay announcement from a relay device based on a first positioning information for the relay device and a second positioning information for the UE, and establish the sidelink connection with the relay device based on the relay announcement.

Another apparatus for wireless communications at a UE is described. The apparatus may include means for identifying a set of candidate relay devices to establish a sidelink connection with the UE, means for receiving a relay announcement from a relay device based on a first positioning information for the relay device and a second positioning information for the UE, and means for establishing the sidelink connection with the relay device based on the relay announcement.

A non-transitory computer-readable medium storing code for wireless communications at a UE is described. The code may include instructions executable by a processor to identify a set of candidate relay devices to establish a sidelink connection with the UE, receive a relay announcement from a relay device based on a first positioning information for the relay device and a second positioning information for the UE, and establish the sidelink connection with the relay device based on the relay announcement.

Some examples of the method, apparatuses, and non-transitory computer-readable medium described herein may further include operations, features, means, or instructions for receiving a relay configuration indicating the set of candidate relay devices.

In some examples of the method, apparatuses, and non-transitory computer-readable medium described herein, the relay configuration may be received from a base station or a previous connected relay device.

In some examples of the method, apparatuses, and non-transitory computer-readable medium described herein, the relay configuration includes positioning information for the set of candidate relay devices, including the first positioning information for the relay device.

In some examples of the method, apparatuses, and non-transitory computer-readable medium described herein, the relay configuration includes scheduling information for relay announcements from the set of candidate relay devices, scheduling information for relay beacon signals from the set of candidate relay devices, or both.

In some examples of the method, apparatuses, and non-transitory computer-readable medium described herein, the relay configuration indicates a set of resources associated with the relay announcement, and monitoring for the relay announcement includes monitoring the set of resources associated with the relay announcement.

Some examples of the method, apparatuses, and non-transitory computer-readable medium described herein may further include operations, features, means, or instructions for receiving, from the set of candidate relay devices, one or more indications that candidate relay devices in the set of candidate relay devices may be stationary.

Some examples of the method, apparatuses, and non-transitory computer-readable medium described herein may further include operations, features, means, or instructions for determining positioning information for the set of candidate relay devices based on the one or more indications.

Some examples of the method, apparatuses, and non-transitory computer-readable medium described herein may further include operations, features, means, or instructions for transmitting, to the relay device, a relay discovery request based on the relay device being within a range of the UE, where receiving the relay announcement may be based on transmitting the relay discovery request.

Some examples of the method, apparatuses, and non-transitory computer-readable medium described herein may further include operations, features, means, or instructions for receiving reference signals from the set of candidate relay devices, performing positioning measurements for the set of candidate relay devices based on receiving the reference signals, and determining positioning information for the set of candidate relay devices based on the positioning measurements.

Some examples of the method, apparatuses, and non-transitory computer-readable medium described herein may further include operations, features, means, or instructions for identifying a set of resources associated with the relay announcement, where receiving the relay announcement includes monitoring the set of resources associated with the relay announcement.

In some examples of the method, apparatuses, and non-transitory computer-readable medium described herein, the set of resources may be preconfigured at the UE or dedicated for relay messages, or both.

In some examples of the method, apparatuses, and non-transitory computer-readable medium described herein, the set of resources correspond to a subset of resource blocks of a resource pool configured for the UE.

A method for wireless communications at a relay device is described. The method may include indicating a first positioning information of the relay device to establish a sidelink connection with a UE, transmitting a relay announcement to the UE based on the first positioning information for the relay device, and establishing the sidelink connection with the UE based on the relay announcement.

An apparatus for wireless communications at a relay device is described. The apparatus may include a processor, memory coupled with the processor, and instructions stored in the memory. The instructions may be executable by the processor to cause the apparatus to indicate a first positioning information of the relay device to establish a sidelink connection with a UE, transmit a relay announcement to the UE based on the first positioning information for the relay device, and establish the sidelink connection with the UE based on the relay announcement.

Another apparatus for wireless communications at a relay device is described. The apparatus may include means for indicating a first positioning information of the relay device to establish a sidelink connection with a UE, means for transmitting a relay announcement to the UE based on the first positioning information for the relay device, and means for establishing the sidelink connection with the UE based on the relay announcement.

A non-transitory computer-readable medium storing code for wireless communications at a relay device is described. The code may include instructions executable by a processor to indicate a first positioning information of the relay device to establish a sidelink connection with a UE, transmit a relay announcement to the UE based on the first positioning information for the relay device, and establish the sidelink connection with the UE based on the relay announcement.

Some examples of the method, apparatuses, and non-transitory computer-readable medium described herein may further include operations, features, means, or instructions for indicating scheduling information for relay announcements from the relay device, scheduling information for relay beacon signals from the relay device, or both.

In some examples of the method, apparatuses, and non-transitory computer-readable medium described herein, the first positioning information includes an indication that the relay device may be stationary.

Some examples of the method, apparatuses, and non-transitory computer-readable medium described herein may further include operations, features, means, or instructions for receiving, from the UE, a relay discovery request based on the relay device being within a range of the UE, where the transmitting the relay announcement may be based on receiving the relay discovery request.

Some examples of the method, apparatuses, and non-transitory computer-readable medium described herein may further include operations, features, means, or instructions for identifying a set of resources associated with the relay announcement, where transmitting the relay announcement includes transmitting the relay announcement using the set of resources.

In some examples of the method, apparatuses, and non-transitory computer-readable medium described herein, the set of resources may be preconfigured for the UE or dedicated for relay messages, or both.

In some examples of the method, apparatuses, and non-transitory computer-readable medium described herein, the set of resources correspond to a subset of resource blocks of a resource pool configured for the UE.

A method for wireless communications at a UE is described. The method may include monitoring a resource pool for a relay broadcast from a relay device according to a passive relay discovery mode, detecting a trigger to switch from the passive relay discovery mode to an active relay discovery mode, periodically transmitting a relay discovery request to the relay device based on the active relay discovery mode, receiving a relay announcement from the relay device based on transmitting the relay discovery request, and establishing a sidelink connection with the relay device based on the relay announcement.

An apparatus for wireless communications at a UE is described. The apparatus may include a processor, memory coupled with the processor, and instructions stored in the memory. The instructions may be executable by the processor to cause the apparatus to monitor a resource pool for a relay broadcast from a relay device according to a passive relay discovery mode, detect a trigger to switch from the passive relay discovery mode to an active relay discovery mode, periodically transmit a relay discovery request to the relay device based on the active relay discovery mode, receive a relay announcement from the relay device based on transmitting the relay discovery request, and establish a sidelink connection with the relay device based on the relay announcement.

Another apparatus for wireless communications at a UE is described. The apparatus may include means for monitoring a resource pool for a relay broadcast from a relay device according to a passive relay discovery mode, means for detecting a trigger to switch from the passive relay discovery mode to an active relay discovery mode, means for periodically transmitting a relay discovery request to the relay device based on the active relay discovery mode, means for receiving a relay announcement from the relay device based on transmitting the relay discovery request, and means for establishing a sidelink connection with the relay device based on the relay announcement.

A non-transitory computer-readable medium storing code for wireless communications at a UE is described. The code may include instructions executable by a processor to monitor a resource pool for a relay broadcast from a relay device according to a passive relay discovery mode, detect a trigger to switch from the passive relay discovery mode to an active relay discovery mode, periodically transmit a relay discovery request to the relay device based on the active relay discovery mode, receive a relay announcement from the relay device based on transmitting the relay discovery request, and establish a sidelink connection with the relay device based on the relay announcement.

In some examples of the method, apparatuses, and non-transitory computer-readable medium described herein, detecting the trigger may include operations, features, means, or instructions for identifying a high priority message may be pending communication.

In some examples of the method, apparatuses, and non-transitory computer-readable medium described herein, detecting the trigger may include operations, features, means, or instructions for determining a timer associated with the passive relay discovery mode may have expired.

Some examples of the method, apparatuses, and non-transitory computer-readable medium described herein may further include operations, features, means, or instructions for receiving, from a base station, an indication to use the passive relay discovery mode or the active relay discovery mode.

DETAILED DESCRIPTION

Figure 1:
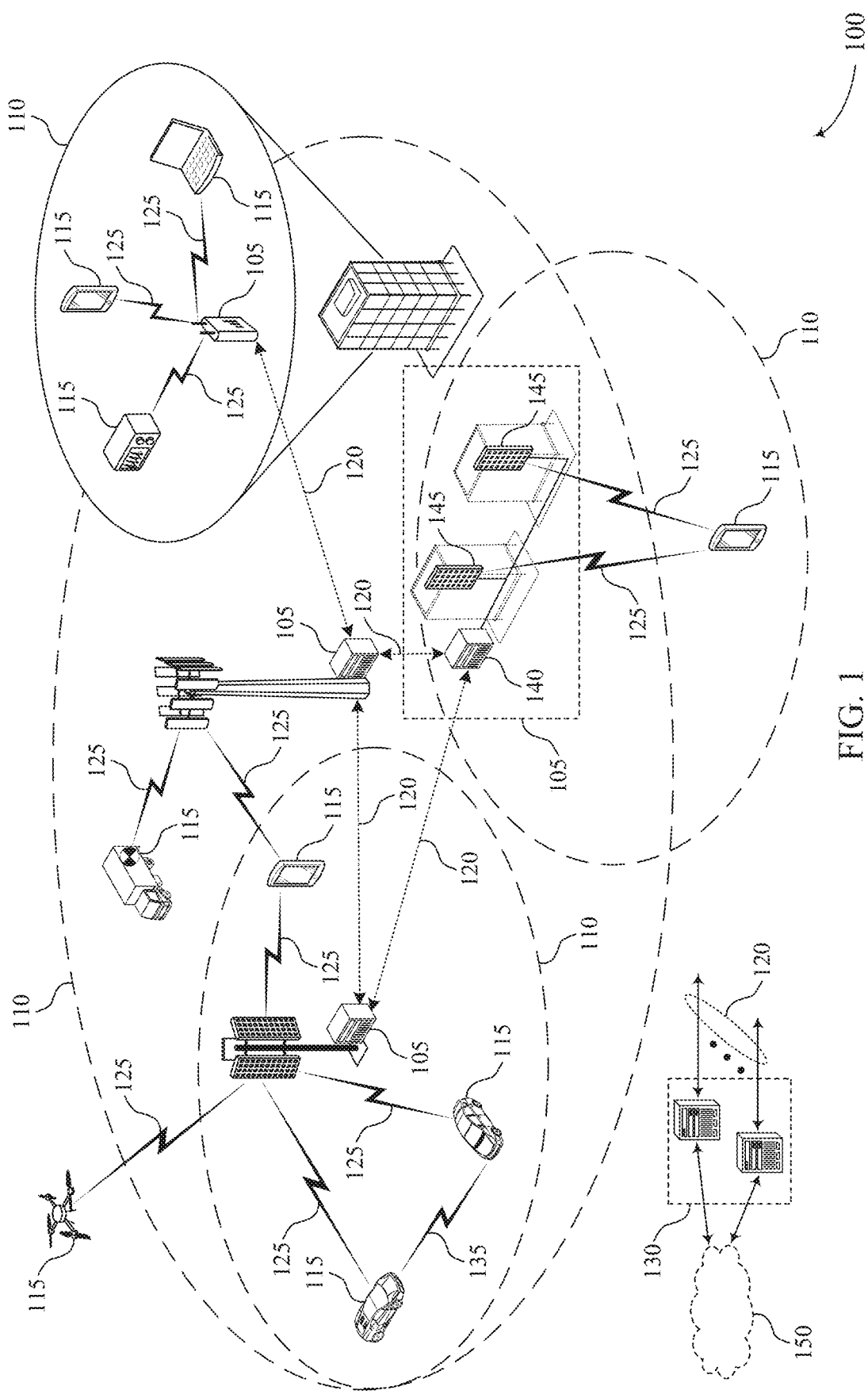
FIG. 1 illustrates an example of a system for wireless communications that supports power efficient relay discovery procedure for sidelink in accordance with aspects of the present disclosure.

A user equipment (UE), may establish a sidelink connection with a relay device to facilitate the transfer of information (e.g. user data) between the UE and a wireless network. The relay device may further communicate with a base station, for example to relay the user data to or from the UE. To establish a sidelink connection, the UE (e.g., a remote UE) may first identify, or discover, the presence of at least one suitable relay device. In some systems, the remote UE may discover the relay device through single-message based discovery. In some examples of single-message based discovery, the relay device may periodically transmit sidelink discovery messages. In other examples, the remote UE may transmit a sidelink discovery message, such as a relay discovery request, and a nearby relay device may transmit a response (e.g. a relay announcement) back to the remote UE. Some single-message based discovery procedures may use high amounts of power at the remote UE to establish the relay connection. Additionally, some devices (e.g. light, or low power, UEs) may be unable to support single-message based discovery procedures due to the high power usage. Techniques described herein provide power-efficient discovery procedures.

In some cases, a remote UE may implement a two-stage discovery procedure. In some cases, the two-stage discovery procedure may be referred to as a passive mode for relay discovery. For a two-stage discovery procedure, the remote UE may first detect a suitable relay device, then the remote UE may perform processing to establish the relay connection. In the first stage, the remote UE may monitor for a relay beacon, which may be periodically broadcast by a relay device. The relay beacon may include a known sequence to the remote UE. If the relay beacon satisfies a relay selection criterion, the UE may perform the second stage of the discovery procedure. For example, the UE may determine whether a measured power of the detected relay beacon satisfies a threshold. In the second stage, the remote UE may monitor for a relay announcement from the relay device and attempt to establish the relay connection. In some examples, the relay device may include an indication of a resource for the relay announcement in the relay beacon. The remote UE may then monitor the resource indicated by the relay beacon for the relay announcement. In some other examples, the remote UE may transmit a relay discovery request to the relay device, and the relay device may then transmit the relay announcement to the remote UE. Based on the information in the relay announcement, the remote UE may determine whether to establish a sidelink connection with the relay device.

Some additional techniques for proximity-based discovery are described herein. For example, a remote UE may initiate a discovery procedure based on proximity to one or more nearby relay devices. In some examples, a remote UE may maintain a database of relay devices to determine if a relay device is nearby. In some cases, a base station may configure the remote UE with positioning information for one or more candidate stationary relay devices. In some other cases, the relay devices may indicate their positioning information to the remote UE (e.g., including that the relay devices are stationary), and the remote UE may record the positioning information for the stationary relay devices. In some cases, a remote UE may perform positioning measurements to identify nearby relay devices.

In some additional, or alternative, aspects, a remote UE may support both a passive discovery mode and an active discovery mode. In the passive mode, the remote UE may passively search for relay beacons, relay announcements, or both. In the active mode, the remote UE may periodically transmit a sidelink connection request in an attempt to establish a sidelink connection. In some examples, a base station may configure a remote UE to use a certain discovery mode. In other examples, the remote UE may first operate in passive mode and switch to active mode under certain conditions. For example, the remote UE may switch to the active mode if the remote UE fails to find a relay after a period of passive discovery, or if the remote UE has delay-sensitive or high-priority data to send or receive. In accordance with examples of the present disclosure, a remote UE and a relay UE may utilize a power-efficient discovery procedure to establish a sidelink connection. These techniques may generally consume less power than single-message discovery techniques by reducing an amount of transmission or monitoring at remote UEs and relay devices.

Aspects of the disclosure are initially described in the context of wireless communications systems. Aspects of the disclosure are further illustrated by and described with reference to apparatus diagrams, system diagrams, and flowcharts that relate to power efficient relay discovery procedure for sidelink.

FIG. 1 illustrates an example of a wireless communications system 100 that supports power efficient relay discovery procedure for sidelink in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

A UE 115 may implement a two-stage discovery procedure which implements a relay beacon. For a two-stage discovery procedure, the UE 115 may first detect a suitable relay device, then the UE 115 may perform processing to establish a relay connection. In the first stage, a UE 115 may monitor for the relay beacon, which may be periodically broadcast by a relay device. The relay device may be an example of a UE 115, a base station 105, a roadside unit, or another wireless device. If a measured power of the detected relay beacon exceeds a threshold, the UE 115 may perform the second stage of the discovery procedure.

In the second stage, the UE 115 may monitor for a relay announcement from the relay device and attempt to establish the relay connection. In some examples, the relay device may include an indication of a resource for the relay announcement in the relay beacon. The UE 115 may then monitor the resource indicated by the relay beacon for the relay announcement. In some other examples, the UE 115 may transmit a relay discovery request to the relay device, and the relay device may then transmit the relay announcement to the UE 115. Based on the information in the relay announcement, the UE 115 may determine whether to establish a sidelink connection with the relay device.

Some additional techniques for proximity-based discovery are described herein. For example, a UE 115 may initiate a discovery procedure based on proximity to one or more nearby relay devices. A UE 115 may maintain a database of relay devices and use positioning information of the relay devices and the UE 115 to determine if a relay device is nearby. In some cases, the UE 115 may be configured with positioning information for the candidate relay devices, and in some cases the UE 115 may determine and record the positioning information for the candidate relay devices.

In some additional, or alternative, aspects, a UE 115 may support both a passive discovery mode and an active discovery mode. In the passive mode, the UE 115 may passively search for relay beacons, relay announcements, or both. In the active mode, the UE 115 may periodically transmit a sidelink connection request in an attempt to establish a sidelink connection. In some examples, a base station may configure a UE 115 to use a certain discovery mode. In other examples, the UE 115 may first operate in passive mode and switch to active mode under certain conditions. For example, the UE 115 may switch to the active mode if the UE 115 fails to find a relay after a period of passive discovery, or if the UE 115 has delay-sensitive or high-priority data to send or receive.

Figure 2:
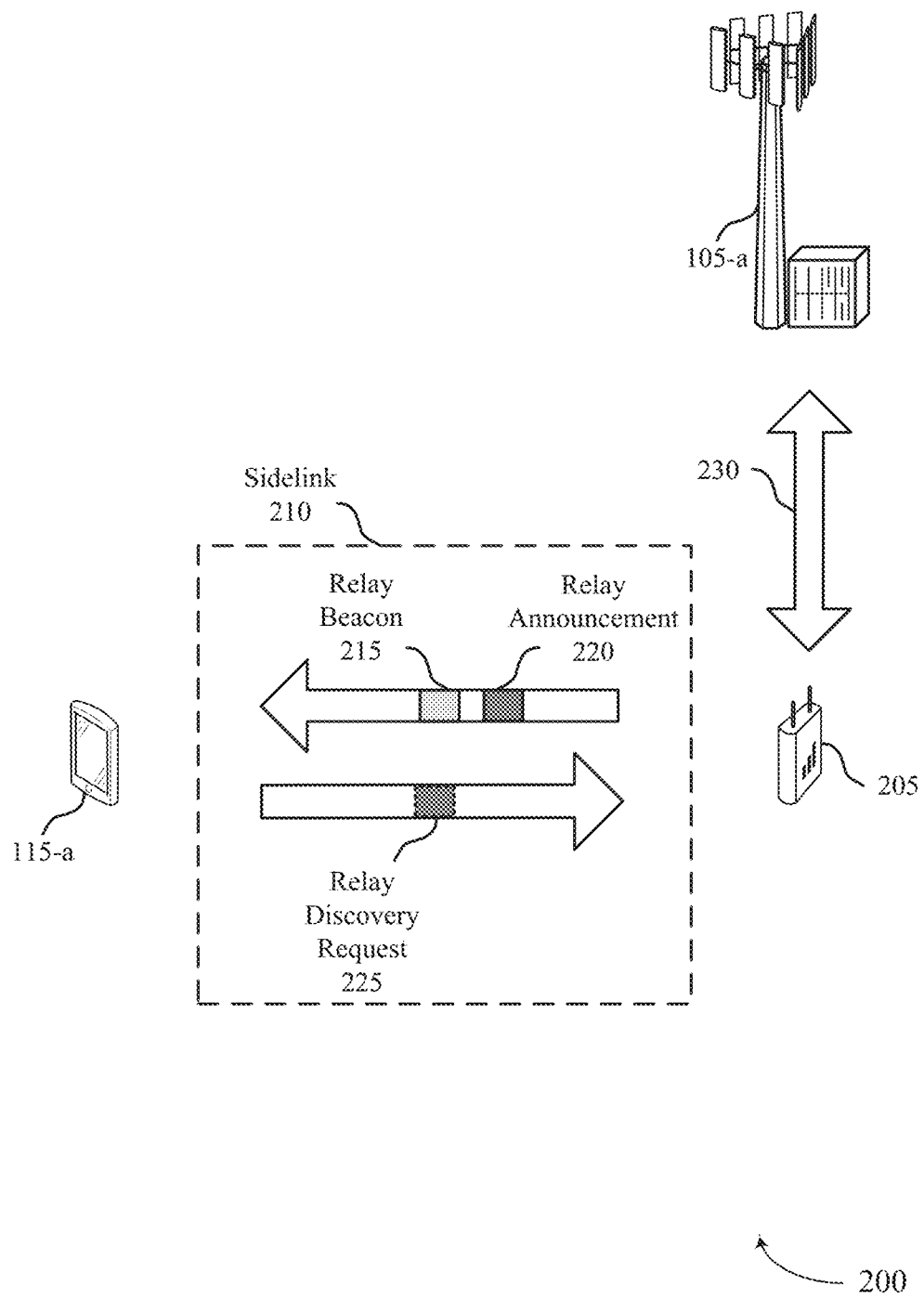
FIG. 2 illustrates an example of a wireless communications system that supports power efficient relay discovery procedure for sidelink in accordance with aspects of the present disclosure.

FIG. 2 illustrates an example of a wireless communications system 200 that supports power efficient relay discovery procedure for sidelink in accordance with aspects of the present disclosure. In some examples, wireless communications system 200 may implement aspects of wireless communications system 100.

The wireless communications system 200 may include UE 115-*a*, base station 105-*a*, and a relay device 205. UE 115-*a* and base station 105-*a* may be respective examples of a UE 115 and a base station 105 described with reference to FIG. 1. The relay device 205 may be an example of a UE 115, a base station 105, a transmission and reception point (TRP), a roadside unit, or any combination thereof.

The wireless communications system 200 may support sidelink communications between devices. For example, the wireless communications system 200 may implement some aspects of a vehicle-to-everything (V2X) wireless communications system, or some other wireless communications system which utilizes sidelink communications. In some examples, devices may communicate over a PC5 interface for a sidelink channel 210.

UE 115-*a* may attempt to establish a relay connection with base station 105-*a* via a relay device 205. To establish a sidelink connection, UE 115-*a* may first discover the presence of at least one suitable relay device. The relay device 205 may facilitate the transfer of information (e.g. user data) between UE 115-*a* and base station 105-*a*. In some examples, UE 115-*a* may be an example of a remote UE, and the relay device 205 may be an example of a relay UE. The relay device 205 may communicate with base station 105-*a* via a link 230.

In some systems, a remote UE 115 may discover a relay device through single-message based discovery. In some examples of single-message based discovery, the relay device may periodically transmit sidelink discovery messages. In other examples, the remote UE 115 may transmit a sidelink discovery message, such as a relay discovery request, and a nearby relay device may transmit a response (e.g. a relay announcement) back to the remote UE 115. Some single-message based discovery procedures may use high amounts of power at the remote UE 115 to establish the relay connection. Additionally, some devices (e.g. light, or low power, UEs 115) may be unable to support single-message based discovery procedures due to the high power usage. Techniques described herein provide power-efficient discovery procedures.

For example, UE 115-*a* may implement a two-stage discovery procedure. In some cases, the two-stage discovery procedure may be referred to as a passive mode for relay discovery. For a two-stage discovery procedure, UE 115-*a* may first detect a suitable relay device, then UE 115-*a* may perform processing to establish the relay connection.

In the first stage of the two-stage discovery procedure, UE 115-*a* may monitor for a relay beacon 215. The relay beacon 215 may be periodically broadcast by a relay device 205. The relay beacon 215 may include, or be, a sequence that is known to UE 115-*a*.

In a first example, the relay beacon 215 may include a known sequence (e.g., include just a known sequence). In some examples, the relay beacon 215 may be scrambled by an identifier. In some cases, the identifier may be an identifier of the relay device 205. In some cases, the identifier may be a code which may assist UE 115-*a* to identify relays in the vicinity of UE 115-*a*. For example, the identifier may be a code which may be shorter than a relay device identifier, but long enough to assist UE 115-*a* in relay device identification. In some examples, the network (e.g., the relay device 205) may transmit a relay announcement 220. In some cases, the relay announcement may be transmitted according to a pre-configured offset in time with respect to the relay beacon 215. The relay announcement 220 may be transmitted in a same resource pool as the relay beacon or a different resource pool.

In a second example, the relay beacon 215 may include a known sequence and a payload. In some examples, the relay beacon may be scrambled by an identifier. The identifier may be an identifier of the relay device 205, or the identifier may be a shorter code whose range is long enough to assist UE 115-*a* in identifying relay devices within the vicinity of UE 115-*a*. In some cases, the sequence may not be scrambled if the relay beacon 215 includes a payload. In some examples, the payload may include an identifier, which may be the identifier of the relay device 205. In some examples, the payload of the relay beacon 215 may include an indication of whether the relay announcement 220 is transmitted. For example, the relay beacon 215 may indicate that the relay announcement 220 is not (e.g., periodically) transmitted, and the relay device 205 may transmit the relay announcement 220 in response to a relay discovery request 225. In some cases, the relay beacon may include an indication that the relay announcement 220 is transmitted. The payload of the relay beacon 215 may include additional information on resource information (e.g., time resources, frequency resources, or both) for the relay announcement 220. For example, the relay beacon 215 may indicate a resource location in a discovery resource pool where the relay announcement 220 is transmitted by the relay device 205.

In some cases, the relay beacon 215 may be transmitted in a dedicated resource pool. For example, the wireless communications system 200 may support a dedicated resource pool for relay signaling, such as relay announcements, relay discovery requests, relay beacons, or any combination thereof. In some cases, the dedicated resource pool may be a segment of a resource pool configured by the network for discovery procedures. In some examples, the dedicated resource pool may be a narrow portion (e.g., in frequency) or a subset of a resource pool or a bandwidth configured for UE 115-*a*. The dedicated resource pool may be used for transmission of relay beacons, discovery announcements, relay discovery requests, or any combination thereof. The discovery resource pool may include one or more global resource pools. In some cases, the discovery resource pool may be commonly known to the relay devices, remote UEs 115, or both.

UE 115-*a* may determine whether to perform the second stage of the discovery procedure based on the relay beacon satisfying a relay selection condition. In some cases, UE 115-*a* may measure a power of the relay beacon 215, and UE 115-*a* may perform the second stage of the discovery procedure if the measured power satisfies the threshold. For example, UE 115-*a* may measure a reference signal received power of the relay beacon 215 and compare the reference signal received power to the threshold. In some examples, the relay selection condition may be based on a proximity of the relay device 205 to UE 115-*a*. For example, UE 115-*a* may estimate whether the relay device 205 is within range based on the relay beacon 215, and UE 115-*a* may perform the second stage of the discovery procedure based on the proximity of the relay device 205.

In the second stage, UE 115-*a* may monitor for a relay announcement 220 from the relay device 205 and attempt to establish the relay connection. In some examples, the relay device 205 may include an indication of a resource for the relay announcement 220 in the relay beacon 215. UE 115-*a* may then monitor the resource indicated by the relay beacon 215 for the relay announcement. In some other examples, UE 115-*a* may transmit a relay discovery request 225 to the relay device 205, and the relay device 205 may then transmit the relay announcement 220 to the remote UE. Based on information in the relay announcement 220, such as unified access control information, UE 115-*a* may determine whether to establish a sidelink connection with the relay device 205. In some cases, UE 115-*a* may establish the sidelink connection with the relay device 205 if UE 115-*a* meets criteria of the unified access control information.

Some additional techniques for proximity-based discovery are described herein. For example, UE 115-*a* may initiate a discovery procedure based on proximity to one or more nearby relay devices. In some cases, UE 115-*a* may trigger a discovery procedure only when knowing there are relay devices nearby. UE 115-*a* may maintain a database of relay devices. In some cases, a base station may configure UE 115-*a* with positioning information for one or more candidate stationary relay devices. Stationary relay devices may report positioning information to a network (e.g., via a base station 105). In some cases, the relay devices may also report scheduling information for relay beacons, relay discovery announcements, or both. The network may then configure UE 115-*a* with a list of candidate stationary relays, which may include the scheduling information, positioning information, or both. In some cases, UE 115-*a* may be configured with the set of candidate stationary relays via RRC signaling. For example, UE 115-*a* may receive an indication of the set of candidate relay devices and corresponding positioning and scheduling information for the candidate relay devices when UE 115-*a* disconnects from the wireless network (e.g., performs RRC release).

In some examples, UE 115-*a* may determine the database of relay devices. For example, stationary relay devices may advertise (e.g., broadcast) to UEs 115 that the relay devices are stationary. UE 115-*a* may receive the advertisement and record positioning information for the candidate relay devices. In some cases, the stationary relay devices may also advertise a schedule of relay beacons, relay announcements, or both.

In some cases, UE 115-*a* may perform positioning measurements to identify nearby relay devices. For example, UE 115-*a* may perform positioning measurements to identify its own positioning information, then UE 115-*a* may use its own positioning information to check for nearby relay devices. If there are nearby candidate relay devices, UE 115-*a* may trigger a discovery procedure. In some cases, the discovery procedure may be a two-stage procedure as described herein. Additionally, or alternatively, UE 115-*a* may implement an active discovery procedure (e.g., UE 115-*a* may periodically broadcast a discovery relay request signal or may monitor for periodically broadcast discovery relay announcement signals). In some cases, the discovery procedure may be based on a ProSe discovery procedure. In some cases, the discovery procedure may use a dedicated resource pool as described herein.

In some additional, or alternative, aspects, UE 115-*a* may support both a passive discovery mode and an active discovery mode. In the passive mode, UE 115-*a* may passively search for relay beacons, relay announcements, or both. Relay devices may broadcast a relay beacon or a relay announcement, or both. In the active mode, UE 115-*a* may periodically transmit a sidelink connection request in an attempt to establish a sidelink connection. In some examples, the network may configure UE 115-*a* to use a certain discovery mode. For example, while UE 115-*a* is connected to base station 105-*a*, base station 105-*a* may configure UE 115-*a* to use, or at least start with, the passive discovery mode or the active discovery mode. In some other examples, UE 115-*a* may switch between the passive mode and the active mode. For example, UE 115-*a* may first operate according to the passive mode and switch to the active mode if a condition is met or trigger-event occurs. For example, UE 115-*a* may switch to the active mode if UE 115-*a* fails to find a relay after a period of passive discovery. Or, UE 115-*a* may switch to the active mode if UE 115-*a* has delay-sensitive or high-priority data to send or receive.

In accordance with examples of the present disclosure, a UE 115 and a relay device may utilize a power-efficient discovery procedure to establish a sidelink connection. These techniques may generally consume less power than single-message discovery techniques by reducing an amount of transmission or monitoring at remote UEs and relay devices. For example, the two-stage, or passive, discovery procedure may reduce energy consumption by passively monitoring for a beacon signal to identify a suitable relay device before performing more energy-consuming signaling or monitoring to establish the connection. Additionally, using positioning information before initiating a discovery procedure may reduce power consumption, as the UE 115 may refrain from using power for the discovery procedure signaling before determining a relay device is within range.

Figure 3:
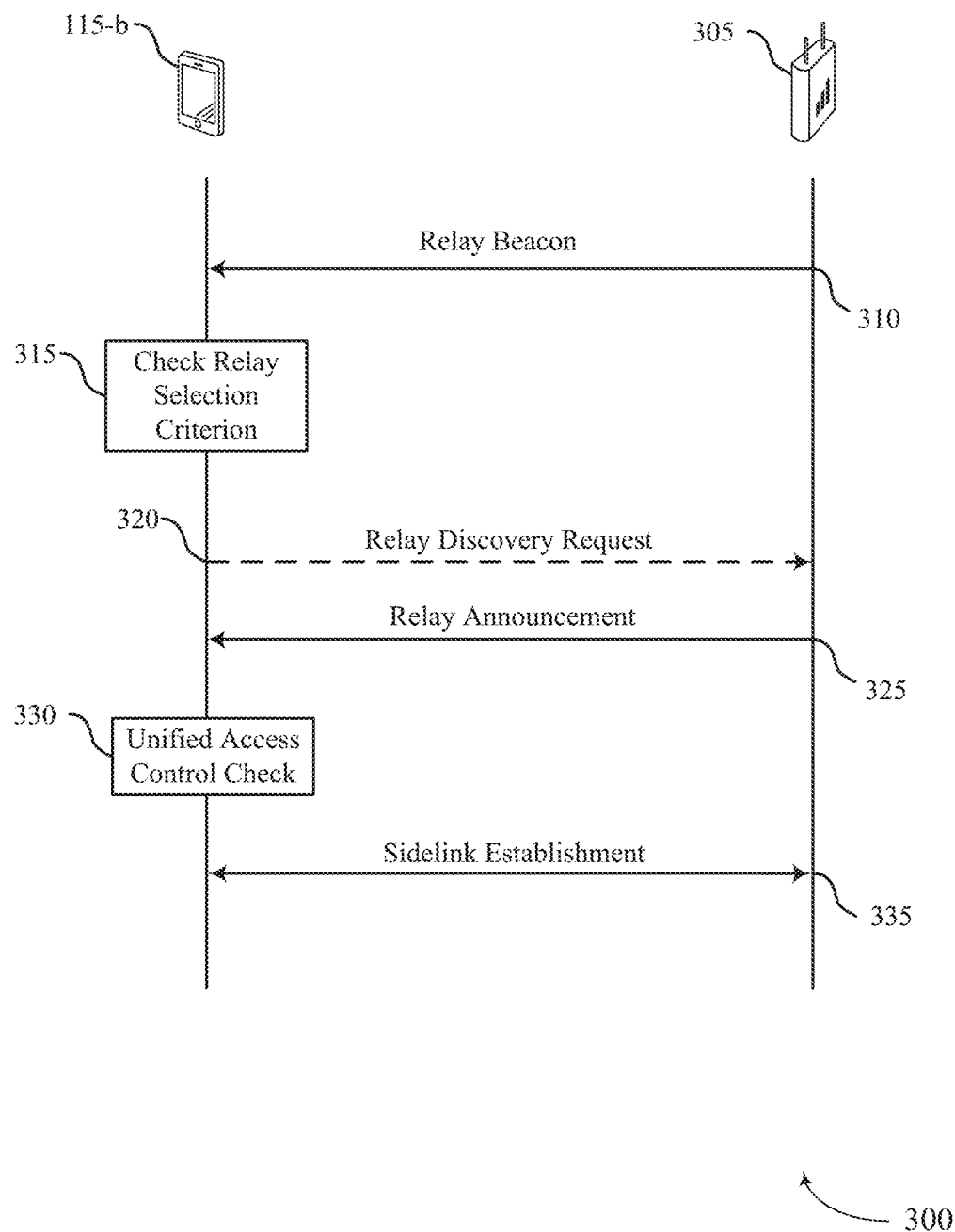
FIG. 3 illustrates an example of a process flow that supports power efficient relay discovery procedure for sidelink in accordance with aspects of the present disclosure.

FIG. 3 illustrates an example of a process flow 300 that supports power efficient relay discovery procedure for sidelink in accordance with aspects of the present disclosure. In some examples, the process flow 300 may implement aspects of wireless communications system 100. The process flow 300 may be implemented by UE 115-*b*, a relay device 305, or both. UE 115-*b* may be an example of a UE 115 as described with reference to FIGS. 1 and 2. The relay device 305 may be an example of a UE 115, a base station 105, a TRP, or a roadside unit, as described with reference to FIGS. 1 and 2, or a relay device 205 described with reference to FIG. 2.

UE 115-*b* may support a two-stage discovery procedure. The two-stage discovery procedure may include a detection phase and a processing phase. During the detection phase, UE 115-*b* may identify a candidate relay device (e.g., the relay device 305) which can provide a relay, or sidelink, connection for UE 115-*b*. During the processing phase, UE 115-*b* may perform signaling to establish the sidelink connection.

At 310, the relay device 305 may transmit a relay beacon using a resource pool. In some cases, the relay device 305 may periodically transmit the relay beacon. the resource pool may be an example of a dedicated resource pool for discovery signaling. UE 115-*b* may monitor the resource pool for the relay beacon from the relay device 305. In some cases, the relay beacon may include a known sequence and may be scrambled by an identifier (e.g., an identifier of the relay device 305 or another, known sequence). In some cases, the relay beacon may include a known sequence and a payload, where the payload may be used to indicate resource information or scheduling information for a relay announcement.

UE 115-*b* may detect the relay beacon in the resource pool. At 315, UE 115-*b* may determine whether the relay beacon satisfies a relay selection criterion. For example, UE 115-*b* may measure a received power of the relay beacon. In some cases, UE 115-*b* may measure a reference signal received power of the relay beacon. If the reference signal received power exceeds the threshold, it may be an indicator that the relay device 305 has a strong enough signal to support a relay connection for UE 115-*b*. Additionally, receiving the relay beacon may be an indicator that the relay device 305 can support the relay connection. If the measurement satisfies a threshold, UE 115-*b* may move to the second stage of the two-stage discovery procedure. For example, 310 through 315 may include the first stage, or the detection stage, of the two-stage discovery process. If the relay beacon does not exceed the threshold, UE 115-*b* may perform the first stage of the two-stage discovery procedure again.

At 325, UE 115-*b* may receive a relay announcement from the relay device 305 based on the relay beacon satisfying the relay selection criterion. In some cases, the relay beacon may include some scheduling or resource information for transmission of the relay announcement. However, in some cases, the relay announcement may be sent "on-demand," or in response to a relay request signal. Therefore, in some cases, at 320, UE 115-*b* may transmit a relay discovery request to the relay device 305. The relay device may transmit the relay announcement in response to the relay discovery request. In some cases, processing the relay beacon and determining whether to monitor for the relay announcement, or whether to transmit the relay discovery request to receive the relay announcement, may be included in the second stage of the two-stage discovery procedure.

At 330, UE 115-*b* may identify unified access control information for the relay device 305. UE 115-*b* may check the unified access control information and determine whether to establish a sidelink connection with the relay device 305. In some cases, the relay announcement may include the unified access control information. In some cases, UE 115-*b* may establish the sidelink connection based on UE 115-*b* meeting the criteria of the unified access control information. In some other cases, UE 115-*b* may skip establishing the sidelink connection with the relay device 305 based on the unified access control information, and UE 115-*b* may perform the discovery procedure again.

Figure 4:
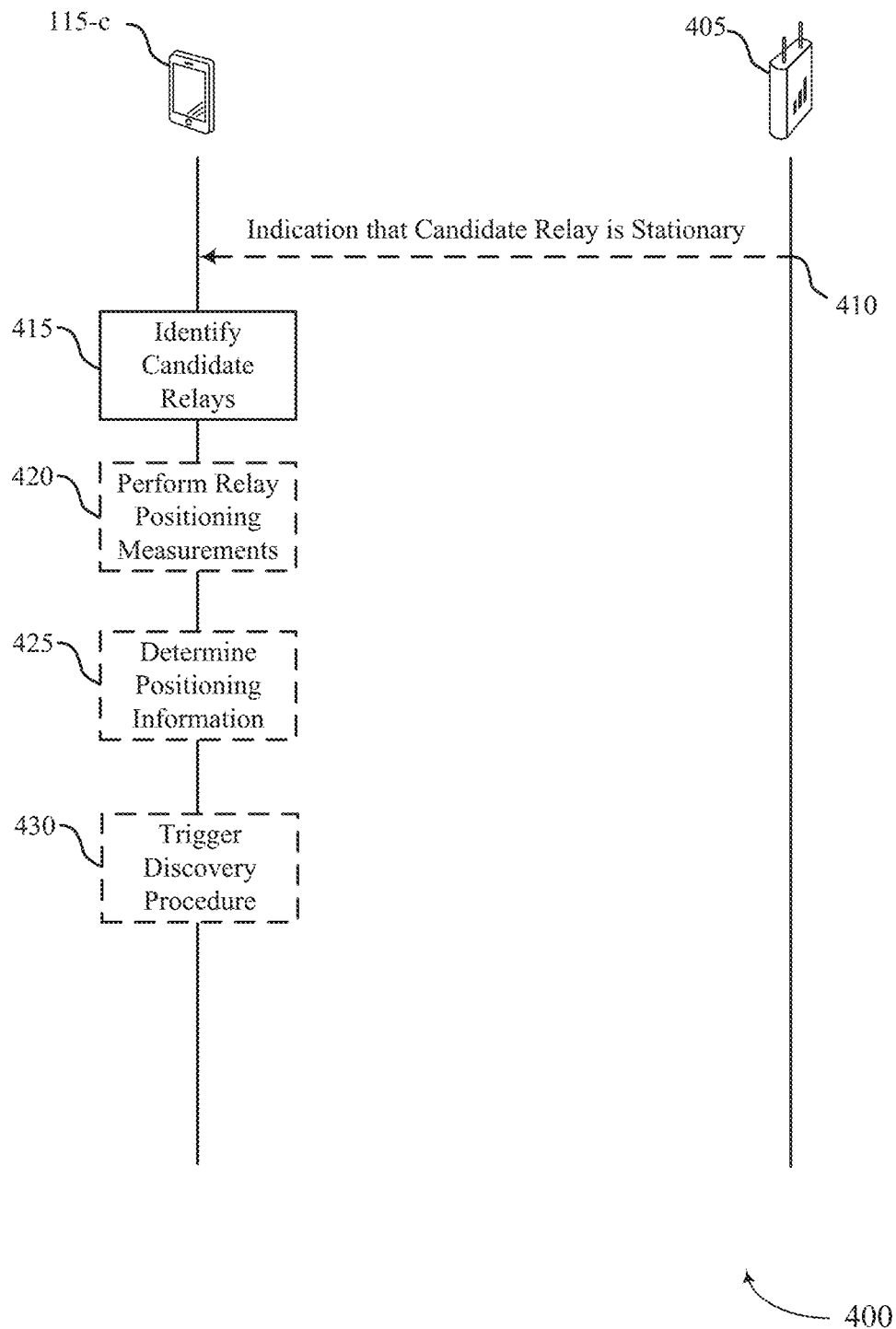
FIG. 4 illustrates an example of a process flow that supports power efficient relay discovery procedure for sidelink in accordance with aspects of the present disclosure.

FIG. 4 illustrates an example of a process flow 400 that supports power efficient relay discovery procedure for sidelink in accordance with aspects of the present disclosure. In some examples, the process flow 400 may implement aspects of wireless communications system 100. The process flow 400 may be implemented by UE 115-*c*, a relay device 405, or both. UE 115-*c* may be an example of a UE 115 as described with reference to FIGS. 1 and 2. The relay device 405 may be an example of a UE 115, a base station 105, a TRP, or a roadside unit, as described with reference to FIGS. 1 and 2, or a relay device 205 described with reference to FIG. 2.

UE 115-*c* may support a positioning-based discovery procedure. For example, UE 115-*c* may trigger, or perform, a discovery procedure only when UE 115-*c* determines there is a nearby relay device (e.g., the relay device 405). The discovery procedure may be a two-stage discovery procedure, or a passive discovery procedure, as described with reference to FIGS. 2 and 3, an active discovery procedure, or both. For example, UE 115-*c* may be configured to use either the passive discovery procedure or the active discovery procedure. Additionally, or alternatively, UE 115-*c* may be configured with a set or triggers to switch between the active and passive discovery procedures.

At 415, UE 115-*c* may identify a set of candidate relay devices to establish a sidelink connection for UE 115-*c*. UE 115-*c* may maintain a database of relays. In some cases, the database may be configured for UE 115-*c* via network assistance. UE 115-*c* may receive a relay configuration with a set of candidate stationary relay devices from the network (e.g., when UE 115-*c* is released from an RRC connection. In some cases, the relay configuration may include resource or scheduling information for relay beacons, relay announcements, or both, from the candidate relay devices. In some cases, the relay configuration may include an indication of a configured set of dedicated resources for discovery signaling.

In some cases, UE 115-*c* may generate the database of relays. For example, at 410, UE 115-*c* may receive, from a set of candidate relay devices, one or more indications that the candidate relay devices in the set of candidate relay devices are stationary. UE 115-*c* may record positions of the stationary relays, generating the database. In some cases, the candidate relay devices may broadcast resource or scheduling information for relay beacons, relay announcements, or both. In some cases, at 420, UE 115-*c* may perform positioning measurements to determine positioning information for the set of candidate relay devices. For example, UE 115-*c* may determine the positioning information based on reference signals transmitted by the set of candidate relay devices.

At 425, UE 115-*c* may determine its positioning information. UE 115-*c* may determine its position from positioning measurements. UE 115-*c* may use its position to check the database of relays to see if there are any candidate relays nearby. If there is a nearby candidate relay device, UE 115-*c* may trigger a discovery procedure at 430. For example, UE 115-*c* may perform a two-stage discovery procedure as described with reference to FIG. 3. In some cases, UE 115-*c* may perform an active discovery procedure, and UE 115-*c* may either transmit a discovery request signals or monitor for a relay announcement from the relay device 405.

Figure 5:
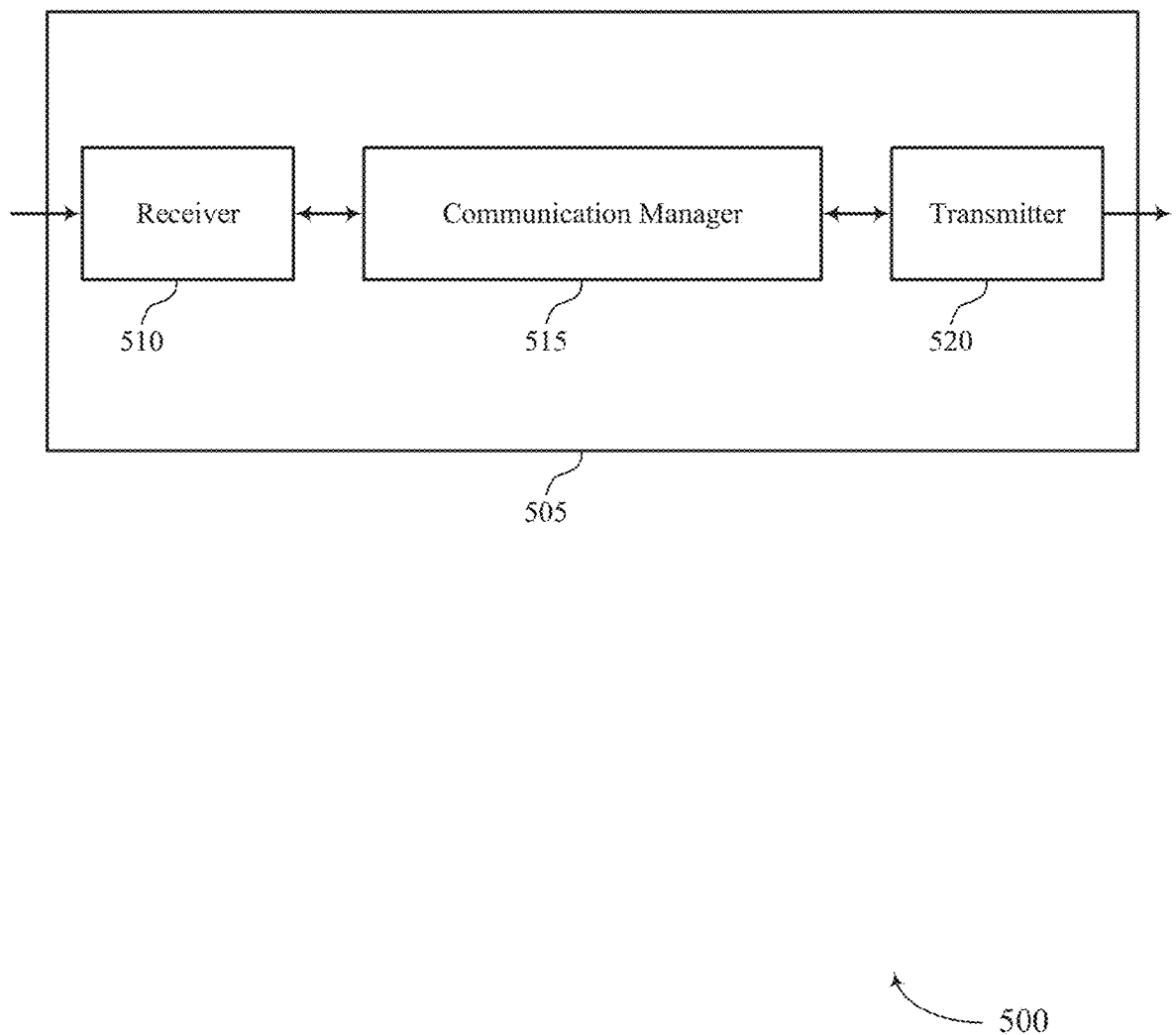
FIGS. 5 and 6 show block diagrams of devices that support power efficient relay discovery procedure for sidelink in accordance with aspects of the present disclosure.

FIG. 5 shows a block diagram 500 of a device 505 that supports power efficient relay discovery procedure for sidelink in accordance with aspects of the present disclosure.

The device 505 may be an example of aspects of a UE 115 as described herein. The device 505 may include a receiver 510, a communication manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to power efficient relay discovery procedure for sidelink, etc.). Information may be passed on to other components of the device 505. The receiver 510 may be an example of aspects of the transceiver 815 described with reference to FIG. 8. The receiver 510 may utilize a single antenna or a set of antennas.

The communication manager 515 may monitor a resource pool for a relay beacon from a relay device, detect the relay beacon in the resource pool, receive a relay announcement from the relay device based on the relay beacon satisfying a relay selection criterion, and establish a sidelink connection with the relay device based on the relay announcement.

The communication manager 515 may also transmit a relay beacon using a resource pool, transmit a relay announcement based on transmitting the relay beacon, and establish a sidelink connection with a UE based on the relay announcement.

The communication manager 515 may also identify a set of candidate relay devices to establish a sidelink connection with the UE, receive a relay announcement from a relay device based on a first positioning information for the relay device and a second positioning information for the UE, and establish the sidelink connection with the relay device based on the relay announcement.

The communication manager 515 may also indicate a first positioning information of the relay device to establish a sidelink connection with a UE, transmit a relay announcement to the UE based on the first positioning information for the relay device, and establish the sidelink connection with the UE based on the relay announcement.

The communication manager 515 may also monitor a resource pool for a relay broadcast from a relay device according to a passive relay discovery mode, detect a trigger to switch from the passive relay discovery mode to an active relay discovery mode, periodically transmit a relay discovery request to the relay device based on the active relay discovery mode, receive a relay announcement from the relay device based on transmitting the relay discovery request, and establish the sidelink connection with the relay device based on the relay announcement. The communication manager 515 may be an example of aspects of the communication manager 810 described herein.

The communication manager 515, or its sub-components, may be implemented in hardware, code (e.g., software or firmware) executed by a processor, or any combination thereof. If implemented in code executed by a processor, the functions of the communication manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 515, or its sub-components, may be physically located at various positions, including being distributed such that portions of functions are implemented at different physical locations by one or more physical components. In some examples, the communication manager 515, or its sub-components, may be a separate and distinct component in accordance with various aspects of the present disclosure. In some examples, the communication manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communication manager 515 as described herein may be implemented to realize one or more potential advantages. One implementation may allow a UE 115 to save power and increase battery life by performing less signaling or monitoring for a discovery procedure. Instead of blindly performing a discovery procedure, sending discovery request signals and monitoring for discovery announcements, the UE 115 may determine that a relay device is available (e.g., within proximity to the UE or with a strong signal strength) before attempting to establish the sidelink connection.

The transmitter 520 may transmit signals generated by other components of the device 505. In some examples, the transmitter 520 may be collocated with a receiver 510 in a transceiver module. For example, the transmitter 520 may be an example of aspects of the transceiver 815 described with reference to FIG. 8. The transmitter 520 may utilize a single antenna or a set of antennas.

Figure 6:
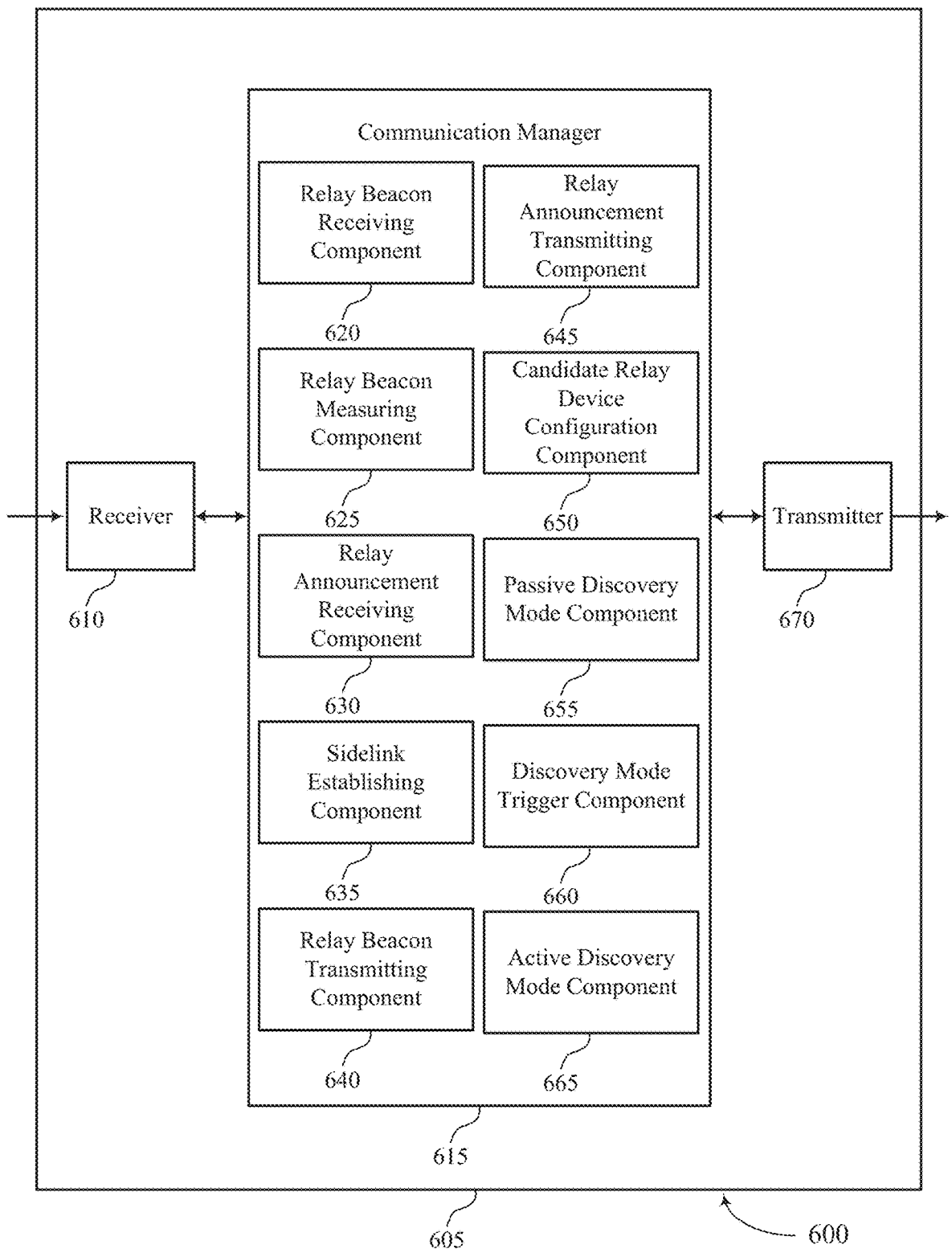

FIG. 6 shows a block diagram 600 of a device 605 that supports power efficient relay discovery procedure for sidelink in accordance with aspects of the present disclosure. The device 605 may be an example of aspects of a device 505, or a UE 115 as described herein. The device 605 may include a receiver 610, a communication manager 615, and a transmitter 670. The device 605 may also include a processor. Each of these components may be in communication with one another (e.g., via one or more buses).

The receiver 610 may receive information such as packets, user data, or control information associated with various information channels (e.g., control channels, data channels, and information related to power efficient relay discovery procedure for sidelink, etc.). Information may be passed on to other components of the device 605. The receiver 610 may be an example of aspects of the transceiver 815 described with reference to FIG. 8. The receiver 610 may utilize a single antenna or a set of antennas.

The communication manager 615 may be an example of aspects of the communication manager 515 as described herein. The communication manager 615 may include a relay beacon receiving component 620, a relay beacon measuring component 625, a relay announcement receiving component 630, a sidelink establishing component 635, a relay beacon transmitting component 640, a relay announcement transmitting component 645, a candidate relay device configuration component 650, a passive discovery mode component 655, a discovery mode trigger component 660, and an active discovery mode component 665. The communication manager 615 may be an example of aspects of the communication manager 810 described herein.

The relay beacon receiving component 620 may monitor a resource pool for a relay beacon from a relay device. The relay beacon measuring component 625 may detect the relay beacon in the resource pool. The relay announcement receiving component 630 may receive a relay announcement from the relay device based on the relay beacon satisfying a relay selection criterion. The sidelink establishing component 635 may establish a sidelink connection with the relay device based on the relay announcement.

The relay beacon transmitting component 640 may transmit a relay beacon using a resource pool. The relay announcement transmitting component 645 may transmit a relay announcement based on transmitting the relay beacon. The sidelink establishing component 635 may establish a sidelink connection with a UE based on the relay announcement.

The candidate relay device configuration component 650 may identify a set of candidate relay devices to establish a sidelink connection with the UE. The relay announcement receiving component 630 may receive a relay announcement from a relay device based on a first positioning information for the relay device and a second positioning information for the UE. The sidelink establishing component 635 may establish the sidelink connection with the relay device based on the relay announcement.

The candidate relay device configuration component 650 may indicate a first positioning information of the relay device to establish a sidelink connection with a UE. The relay announcement transmitting component 645 may transmit a relay announcement to the UE based on the first positioning information for the relay device. The sidelink establishing component 635 may establish the sidelink connection with the UE based on the relay announcement.

The passive discovery mode component 655 may monitor a resource pool for a relay broadcast from a relay device according to a passive relay discovery mode. The discovery mode trigger component 660 may detect a trigger to switch from the passive relay discovery mode to an active relay discovery mode. The active discovery mode component 665 may periodically transmit a relay discovery request to the relay device based on the active relay discovery mode. The relay announcement receiving component 630 may receive a relay announcement from the relay device based on transmitting the relay discovery request. The sidelink establishing component 635 may establish the sidelink connection with the relay device based on the relay announcement.

The transmitter 670 may transmit signals generated by other components of the device 605. In some examples, the transmitter 670 may be collocated with a receiver 610 in a transceiver module. For example, the transmitter 670 may be an example of aspects of the transceiver 815 described with reference to FIG. 8. The transmitter 670 may utilize a single antenna or a set of antennas.

Figure 7:
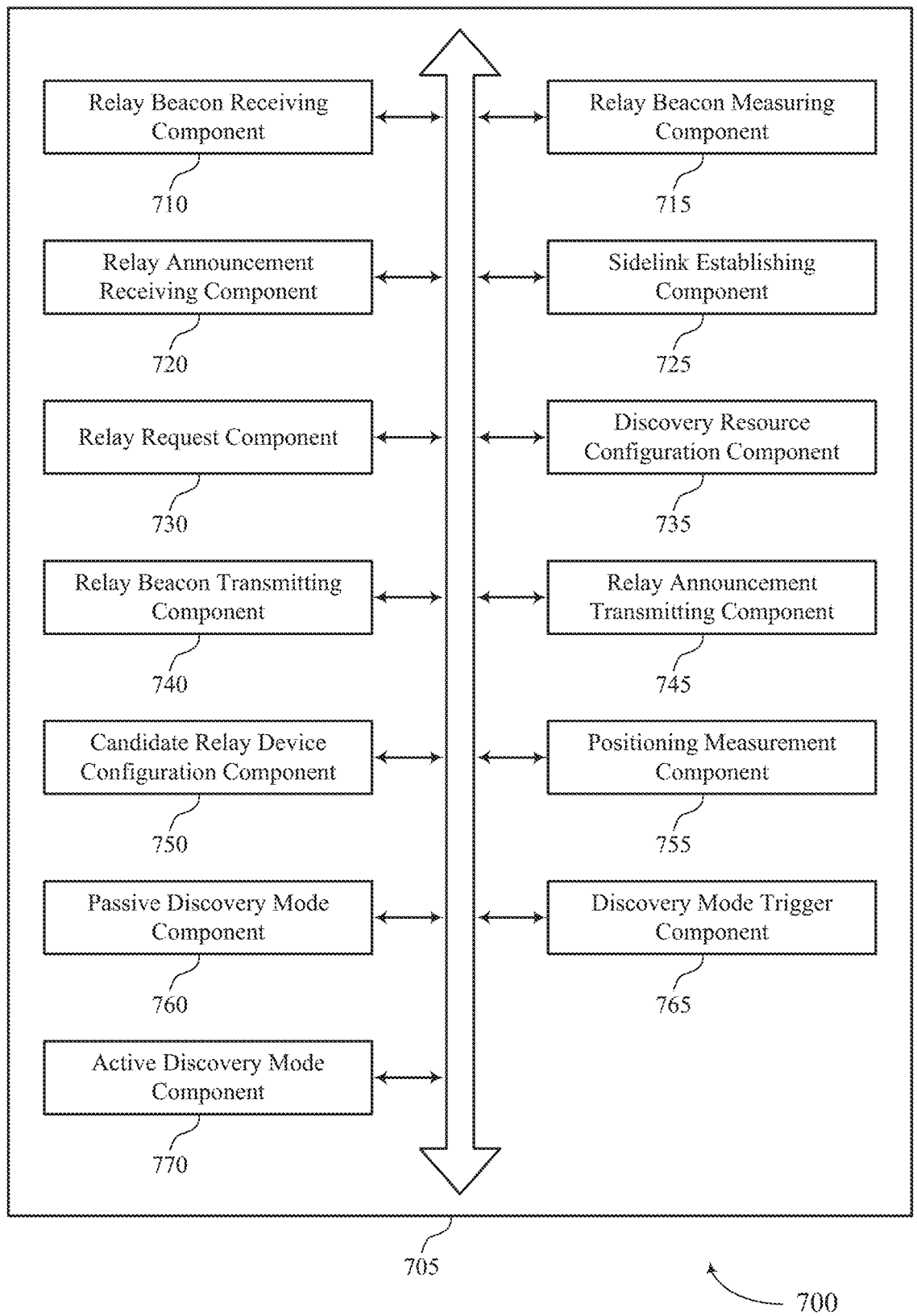
FIG. 7 shows a block diagram of a communication manager that supports power efficient relay discovery procedure for sidelink in accordance with aspects of the present disclosure.

FIG. 7 shows a block diagram 700 of a communication manager 705 that supports power efficient relay discovery procedure for sidelink in accordance with aspects of the present disclosure. The communication manager 705 may be an example of aspects of a communication manager 515, a communication manager 615, or a communication manager 810 described herein. The communication manager 705 may include a relay beacon receiving component 710, a relay beacon measuring component 715, a relay announcement receiving component 720, a sidelink establishing component 725, a relay request component 730, a discovery resource configuration component 735, a relay beacon transmitting component 740, a relay announcement transmitting component 745, a candidate relay device configuration component 750, a positioning measurement component 755, a passive discovery mode component 760, a discovery mode trigger component 765, and an active discovery mode component 770. Each of these modules may communicate, directly or indirectly, with one another (e.g., via one or more buses).

The relay beacon receiving component 710 may monitor a resource pool for a relay beacon from a relay device. In some examples, the relay beacon receiving component 710 may decode the relay beacon based on an identifier which is common to a set of relay devices including the relay device. In some examples, the relay beacon receiving component 710 may decode the relay beacon based at least in part on an identifier or a code associated with relay discovery. In some examples, the relay beacon may be scrambled with an identifier or a code associated with relay discovery. In some cases, the identifier may be an identifier of the relay device or an identifier associated with relay discovery.

In some examples, the relay beacon receiving component 710 may receive, from a base station, one or more sequences associated with the relay devices, the one or more sequences including at least the sequence. In some examples, the relay beacon receiving component 710 may identify a payload of the relay beacon, where the payload includes an identifier of the relay device.

The relay beacon measuring component 715 may detect the relay beacon in the resource pool. In some cases, the relay beacon measuring component 715 may measure a received power of the relay beacon. The relay announcement receiving component 720 may receive a relay announcement from the relay device based on the relay beacon satisfying a relay selection criterion. In some cases, the relay announcement receiving component 720 may receive a relay announcement from the relay device based on the received power of the relay beacon satisfying a threshold.

In some examples, the relay announcement receiving component 720 may receive a relay announcement from a relay device based on a first positioning information for the relay device and a second positioning information for the UE. In some examples, the relay announcement receiving component 720 may receive a relay announcement from the relay device based on transmitting the relay discovery request.

The sidelink establishing component 725 may establish a sidelink connection with the relay device based on the relay announcement. In some examples, the sidelink establishing component 725 may establish a sidelink connection with a UE based on the relay announcement.

In some examples, the sidelink establishing component 725 may identify unified access control information associated with the relay device, where the establishing the sidelink connection is based on the unified access control information. In some examples, the sidelink establishing component 725 may indicate unified access control information associated with the relay device to the UE, where the establishing the sidelink connection is based on the unified access control information. In some examples, the relay announcement may include the unified access control information. In some examples, the sidelink connection is established based on the UE meeting criteria associated with the unified access control information.

The relay beacon transmitting component 740 may transmit a relay beacon using a resource pool. In some examples, the relay beacon transmitting component 740 may encode the relay beacon based on a sequence which is common to a set of relay devices including the relay device.

In some examples, the relay beacon transmitting component 740 may include an identifier of the relay device in a payload of the relay beacon. The relay announcement transmitting component 745 may transmit a relay announcement based on transmitting the relay beacon.

In some examples, the relay announcement transmitting component 745 may transmit a relay announcement to the UE based on the first positioning information for the relay device. The candidate relay device configuration component

750 may identify a set of candidate relay devices to establish a sidelink connection with the UE.

In some examples, the candidate relay device configuration component 750 may indicate a first positioning information of the relay device to establish a sidelink connection with a UE. In some examples, the candidate relay device configuration component 750 may receive a relay configuration indicating the set of candidate relay devices.

In some examples, the candidate relay device configuration component 750 may receive, from the set of candidate relay devices, one or more indications that candidate relay devices in the set of candidate relay devices are stationary. In some examples, the candidate relay device configuration component 750 may determine positioning information for the set of candidate relay devices based on the one or more indications. In some cases, the relay configuration may be received from a base station or a previously connected relay device. In some cases, the relay configuration may include positioning information for the set of candidate relay devices, including the first positioning information for the relay device. In some examples, the relay configuration includes scheduling information for relay announcements from the set of candidate relay devices, scheduling information for relay beacon signals from the set of candidate relay devices, or both.

In some examples, the candidate relay device configuration component 750 may indicate scheduling information for relay announcements from the relay device, scheduling information for relay beacon signals from the relay device, or both. In some cases, the relay configuration indicates a set of resources associated with the relay announcement, where monitoring for the relay announcement includes monitoring the set of resources associated with the relay announcement. In some examples, the first positioning information includes an indication that the relay device is stationary.

The passive discovery mode component 760 may monitor a resource pool for a relay broadcast from a relay device according to a passive relay discovery mode. The discovery mode trigger component 765 may detect a trigger to switch from the passive relay discovery mode to an active relay discovery mode. In some examples, the discovery mode trigger component 765 may identify a high priority message is pending communication. In some examples, the discovery mode trigger component 765 may determine a timer associated with the passive relay discovery mode has expired. In some examples, the discovery mode trigger component 765 may receive, from a base station, an indication to use the passive relay discovery mode or the active relay discovery mode. The active discovery mode component 770 may periodically transmit a relay discovery request to the relay device based on the active relay discovery mode.

The relay request component 730 may transmit, to the relay device, a relay discovery request based on the relay beacon satisfying the relay selection criterion, where receiving the relay announcement is based on transmitting the relay discovery request. in some cases, the relay request component 730 may transmit, to the relay device, a relay discovery request based on the received power of the relay beacon satisfying the threshold, where receiving the relay announcement is based on transmitting the relay discovery request. In some examples, the relay request component 730 may receive, from the UE, a relay discovery request, where the transmitting the relay announcement is based on receiving the relay discovery request. In some examples, the set of resources may be preconfigured at the UE or dedicated for relay messages, or both. In some examples, the set of resources may correspond to a subset of resource blocks of a resource pool or a bandwidth configured for the UE. In some examples, the set of resources associated with the relay announcement are in a different resource pool than the resource pool for the relay beacon, a different slot than the relay beacon, or both. In some examples, the set of resources are configured for a plurality of UEs including at least the UE.

In some examples, the relay request component 730 may transmit, to the relay device, a relay discovery request based on the relay device being within the range of the UE, where receiving the relay announcement is based on transmitting the relay discovery request. In some examples, the relay request component 730 may receive, from the UE, a relay discovery request based on the relay device being within a range of the UE, where the transmitting the relay announcement is based on receiving the relay discovery request.

The discovery resource configuration component 735 may identify a set of resources associated with the relay announcement based on the relay beacon from the relay device, where receiving the relay announcement includes monitoring the set of resources associated with the relay announcement. In some examples, the discovery resource configuration component 735 may indicate a set of resources associated with the relay announcement based on the relay beacon, where transmitting the relay announcement includes transmitting the relay announcement using the set of resources. In some examples, the set of resources are preconfigured at the UE or dedicated for relay discovery messages, or both. In some examples, the set of resources correspond to a subset of resource blocks of a bandwidth configured for the UE. In some examples, the set of resources are preconfigured for the UE or dedicated for relay discovery messages, or both.

The positioning measurement component 755 may receive reference signals from the set of candidate relay devices. In some examples, the positioning measurement component 755 may perform positioning measurements for the set of candidate relay devices based on receiving the reference signals. In some examples, the positioning measurement component 755 may determine positioning information for the set of candidate relay devices based on the positioning measurements.

Figure 8:
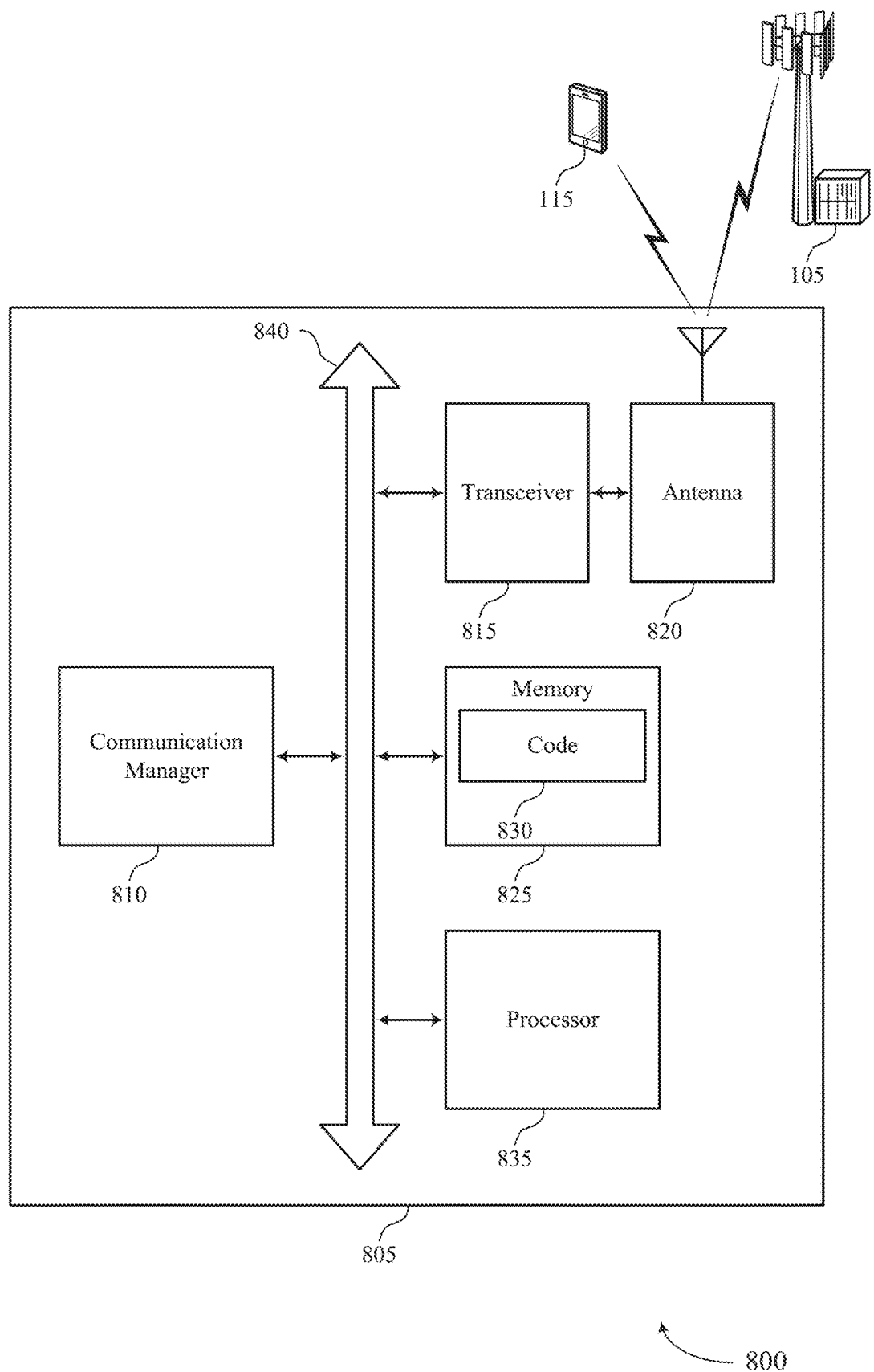
FIG. 8 shows a diagram of a system including a device that supports power efficient relay discovery procedure for sidelink in accordance with aspects of the present disclosure.

FIG. 8 shows a diagram of a system 800 including a device 805 that supports power efficient relay discovery procedure for sidelink in accordance with aspects of the present disclosure. The device 805 may be an example of or include the components of device 505, device 605, or a UE 115 as described herein. The device 805 may include components for bi-directional voice and data communications including components for transmitting and receiving communications, including a communication manager 810, a transceiver 815, an antenna 820, memory 825, and a processor 835. These components may be in electronic communication via one or more buses (e.g., bus 840).

The communication manager 810 may monitor a resource pool for a relay beacon from a relay device, detect the relay beacon in the resource pool, receive a relay announcement from the relay device based on the relay beacon satisfying a relay selection criterion, and establish a sidelink connection with the relay device based on the relay announcement.

The communication manager 810 may also transmit a relay beacon using a resource pool, transmit a relay announcement based on transmitting the relay beacon, and establish a sidelink connection with a UE based on the relay announcement.

The communication manager 810 may also identify a set of candidate relay devices to establish a sidelink connection with the UE, receive a relay announcement from a relay device based on a first positioning information for the relay device and a second positioning information for the UE, and establish the sidelink connection with the relay device based on the relay announcement.

The communication manager 810 may also indicate a first positioning information of the relay device to establish a sidelink connection with a UE, transmit a relay announcement to the UE based on the first positioning information for the relay device, and establish the sidelink connection with the UE based on the relay announcement.

The communication manager 810 may also monitor a resource pool for a relay broadcast from a relay device according to a passive relay discovery mode, detect a trigger to switch from the passive relay discovery mode to an active relay discovery mode, periodically transmit a relay discovery request to the relay device based on the active relay discovery mode, receive a relay announcement from the relay device based on transmitting the relay discovery request, and establish the sidelink connection with the relay device based on the relay announcement.

The transceiver 815 may communicate bi-directionally, via one or more antennas, wired, or wireless links as described above. For example, the transceiver 815 may represent a wireless transceiver and may communicate bi-directionally with another wireless transceiver. The transceiver 815 may also include a modem to modulate the packets and provide the modulated packets to the antennas for transmission, and to demodulate packets received from the antennas.

In some cases, the wireless device may include a single antenna 820. However, in some cases the device may have more than one antenna 820, which may be capable of concurrently transmitting or receiving multiple wireless transmissions.

The memory 825 may include random-access memory (RAM) and read-only memory (ROM). The memory 825 may store computer-readable, computer-executable code 830 including instructions that, when executed, cause the processor to perform various functions described herein. In some cases, the memory 825 may contain, among other things, a basic input/output system (BIOS) which may control basic hardware or software operation such as the interaction with peripheral components or devices.

The code 830 may include instructions to implement aspects of the present disclosure, including instructions to support wireless communications. The code 830 may be stored in a non-transitory computer-readable medium such as system memory or other type of memory. In some cases, the code 830 may not be directly executable by the processor 835 but may cause a computer (e.g., when compiled and executed) to perform functions described herein.

The processor 835 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 835 may be configured to operate a memory array using a memory controller. In other cases, a memory controller may be integrated into the processor 835. The processor 835 may be configured to execute computer-readable instructions stored in a memory (e.g., the memory 825) to cause the device 805 to perform various functions (e.g., functions or tasks supporting power efficient relay discovery procedure for sidelink).

Figure 9:
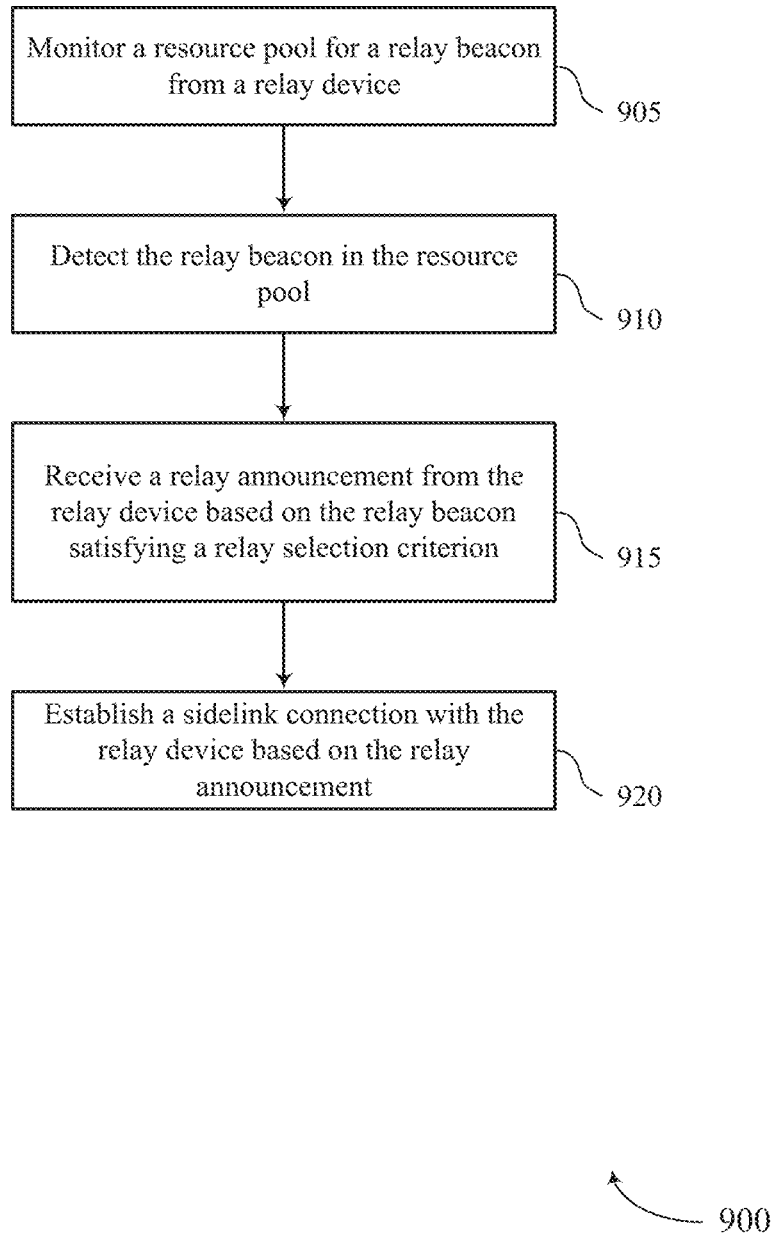
FIGS. 9 through 13 show flowcharts illustrating methods that support power efficient relay discovery procedure for sidelink in accordance with aspects of the present disclosure.

FIG. 9 shows a flowchart illustrating a method 900 that supports power efficient relay discovery procedure for sidelink in accordance with aspects of the present disclosure. The operations of method 900 may be implemented by a UE 115 or its components as described herein. For example, the operations of method 900 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 905, the UE may monitor a resource pool for a relay beacon from a relay device. The operations of 905 may be performed according to the methods described herein. In some examples, aspects of the operations of 905 may be performed by a relay beacon receiving component as described with reference to FIGS. 5 through 8.

At 910, the UE may detect the relay beacon in the resource pool. The operations of 910 may be performed according to the methods described herein. In some examples, aspects of the operations of 910 may be performed by a relay beacon measuring component as described with reference to FIGS. 5 through 8.

At 915, the UE may receive a relay announcement from the relay device based on the relay beacon satisfying a relay selection criterion. For example, the UE may measure a received power of the relay beacon and compare the received power of the relay beacon to a threshold. The operations of 915 may be performed according to the methods described herein. In some examples, aspects of the operations of 915 may be performed by a relay announcement receiving component as described with reference to FIGS. 5 through 8.

At 920, the UE may establish a sidelink connection with the relay device based on the relay announcement. The operations of 920 may be performed according to the methods described herein. In some examples, aspects of the operations of 920 may be performed by a sidelink establishing component as described with reference to FIGS. 5 through 8.

Figure 10:
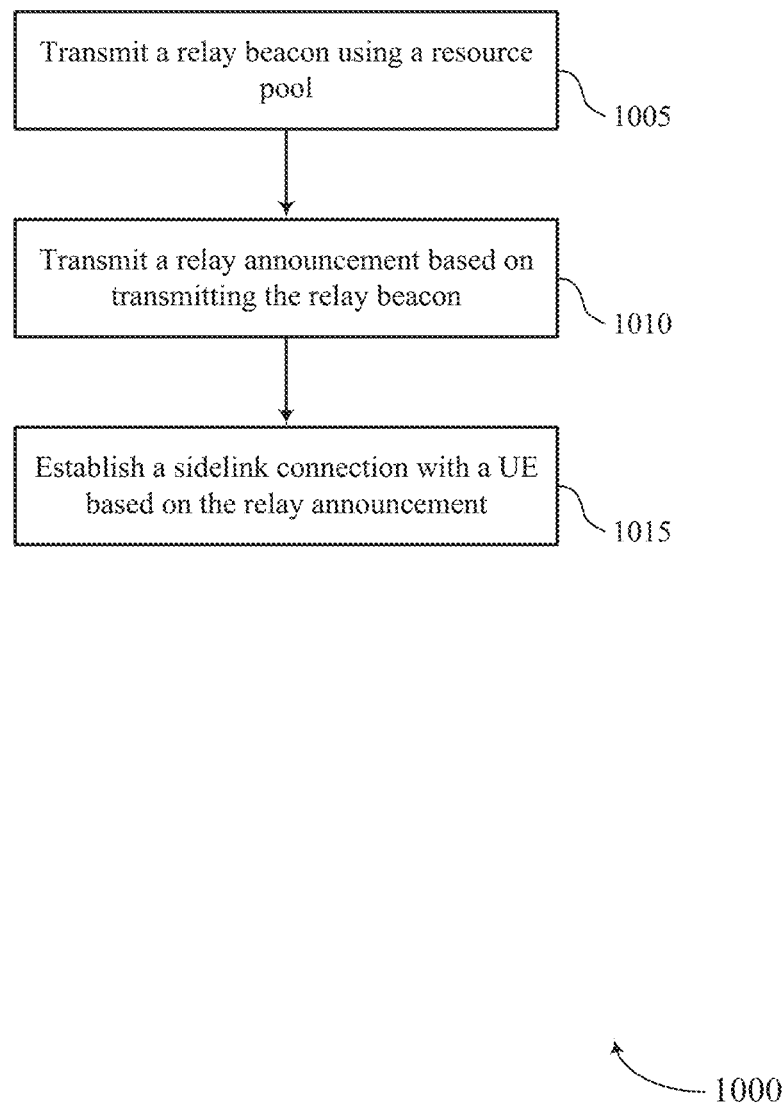

FIG. 10 shows a flowchart illustrating a method 1000 that supports power efficient relay discovery procedure for sidelink in accordance with aspects of the present disclosure. The operations of method 1000 may be implemented by a UE 115 or its components as described herein. For example, the operations of method 1000 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1005, the UE may transmit a relay beacon using a resource pool. The operations of 1005 may be performed according to the methods described herein. In some examples, aspects of the operations of 1005 may be performed by a relay beacon transmitting component as described with reference to FIGS. 5 through 8.

At 1010, the UE may transmit a relay announcement based on transmitting the relay beacon. The operations of 1010 may be performed according to the methods described herein. In some examples, aspects of the operations of 1010 may be performed by a relay announcement transmitting component as described with reference to FIGS. 5 through 8.

At 1015, the UE may establish a sidelink connection with a UE based on the relay announcement. The operations of 1015 may be performed according to the methods described herein. In some examples, aspects of the operations of 1015 may be performed by a sidelink establishing component as described with reference to FIGS. 5 through 8.

Figure 11:
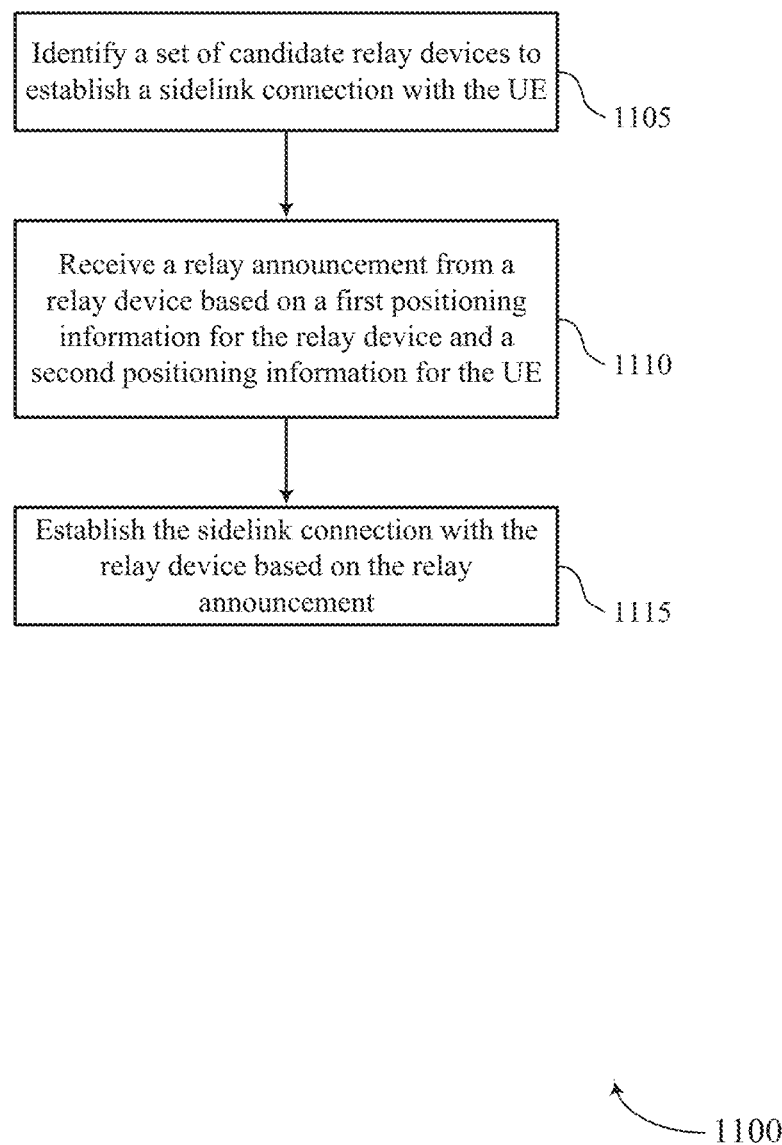

FIG. 11 shows a flowchart illustrating a method 1100 that supports power efficient relay discovery procedure for sidelink in accordance with aspects of the present disclosure. The operations of method 1100 may be implemented by a UE 115 or its components as described herein. For example, the operations of method 1100 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1105, the UE may identify a set of candidate relay devices to establish a sidelink connection with the UE. The operations of 1105 may be performed according to the methods described herein. In some examples, aspects of the operations of 1105 may be performed by a candidate relay device configuration component as described with reference to FIGS. 5 through 8.

At 1110, the UE may receive a relay announcement from a relay device based on a first positioning information for the relay device and a second positioning information for the UE. The operations of 1110 may be performed according to the methods described herein. In some examples, aspects of the operations of 1110 may be performed by a relay announcement receiving component as described with reference to FIGS. 5 through 8.

At 1115, the UE may establish the sidelink connection with the relay device based on the relay announcement. The operations of 1115 may be performed according to the methods described herein. In some examples, aspects of the operations of 1115 may be performed by a sidelink establishing component as described with reference to FIGS. 5 through 8.

Figure 12:
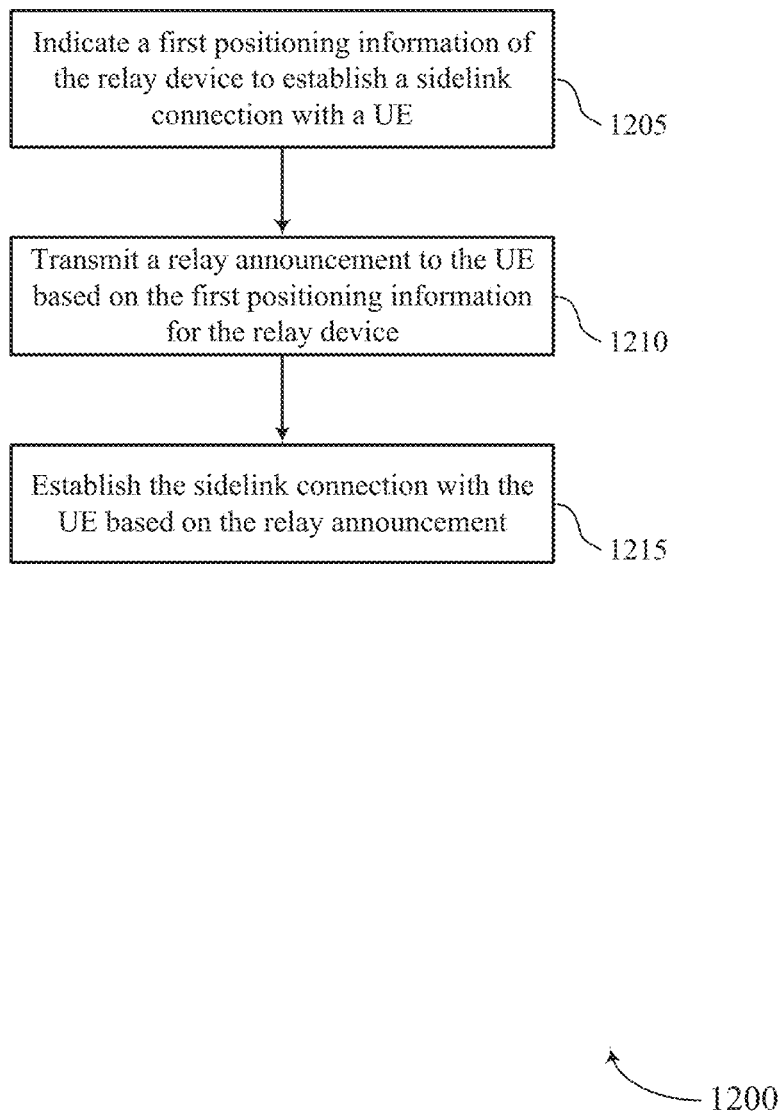

FIG. 12 shows a flowchart illustrating a method 1200 that supports power efficient relay discovery procedure for sidelink in accordance with aspects of the present disclosure. The operations of method 1200 may be implemented by a UE 115 or its components as described herein. For example, the operations of method 1200 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1205, the UE may indicate a first positioning information of the relay device to establish a sidelink connection with a UE. The operations of 1205 may be performed according to the methods described herein. In some examples, aspects of the operations of 1205 may be performed by a candidate relay device configuration component as described with reference to FIGS. 5 through 8.

At 1210, the UE may transmit a relay announcement to the UE based on the first positioning information for the relay device. The operations of 1210 may be performed according to the methods described herein. In some examples, aspects of the operations of 1210 may be performed by a relay announcement transmitting component as described with reference to FIGS. 5 through 8.

At 1215, the UE may establish the sidelink connection with the UE based on the relay announcement. The operations of 1215 may be performed according to the methods described herein. In some examples, aspects of the operations of 1215 may be performed by a sidelink establishing component as described with reference to FIGS. 5 through 8.

Figure 13:
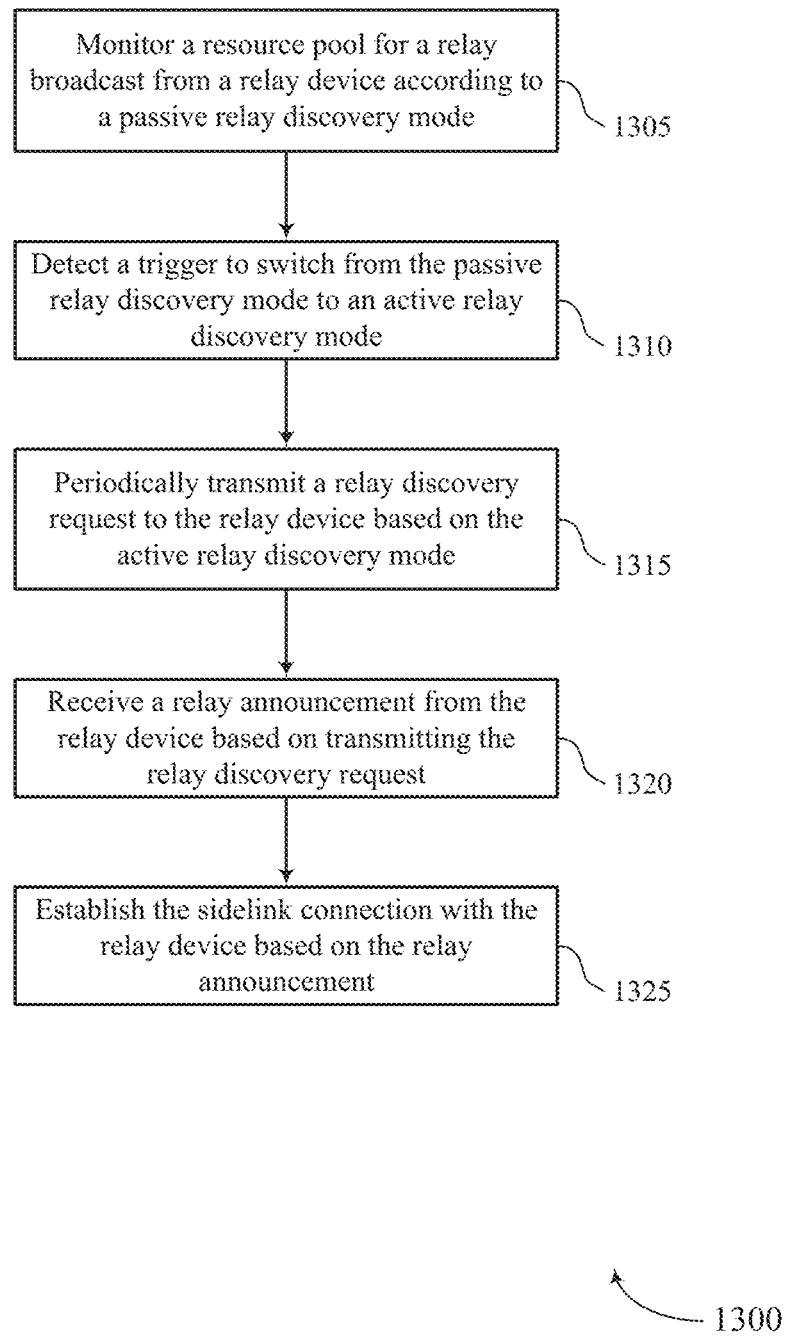

FIG. 13 shows a flowchart illustrating a method 1300 that supports power efficient relay discovery procedure for sidelink in accordance with aspects of the present disclosure. The operations of method 1300 may be implemented by a UE 115 or its components as described herein. For example, the operations of method 1300 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1305, the UE may monitor a resource pool for a relay broadcast from a relay device according to a passive relay discovery mode. The operations of 1305 may be performed according to the methods described herein. In some examples, aspects of the operations of 1305 may be performed by a passive discovery mode component as described with reference to FIGS. 5 through 8.

At 1310, the UE may detect a trigger to switch from the passive relay discovery mode to an active relay discovery mode. The operations of 1310 may be performed according to the methods described herein. In some examples, aspects of the operations of 1310 may be performed by a discovery mode trigger component as described with reference to FIGS. 5 through 8.

At 1315, the UE may periodically transmit a relay discovery request to the relay device based on the active relay discovery mode. The operations of 1315 may be performed according to the methods described herein. In some examples, aspects of the operations of 1315 may be performed by an active discovery mode component as described with reference to FIGS. 5 through 8.

At 1320, the UE may receive a relay announcement from the relay device based on transmitting the relay discovery request. The operations of 1320 may be performed according to the methods described herein. In some examples, aspects of the operations of 1320 may be performed by a relay announcement receiving component as described with reference to FIGS. 5 through 8.

At 1325, the UE may establish the sidelink connection with the relay device based on the relay announcement. The operations of 1325 may be performed according to the methods described herein. In some examples, aspects of the operations of 1325 may be performed by a sidelink establishing component as described with reference to FIGS. 5 through 8.

The following provides an overview of aspects of the present disclosure:

Aspect 1: A method for wireless communications at a UE, comprising: monitoring a resource pool for a relay beacon from a relay device; detecting the relay beacon in the resource pool; receiving a relay announcement from the relay device based at least in part on the relay beacon satisfying a relay selection criterion; and establishing a sidelink connection with the relay device based at least in part on the relay announcement.

Aspect 2: The method of aspect 1, further comprising: transmitting, to the relay device, a relay discovery request based at least in part on the relay beacon satisfying the relay selection criterion, wherein receiving the relay announcement is based at least in part on transmitting the relay discovery request.

Aspect 3: The method of any of aspects 1 through 2, further comprising: identifying a set of resources associated with the relay announcement based at least in part on the relay beacon from the relay device, wherein receiving the relay announcement comprises monitoring the set of resources associated with the relay announcement.

Aspect 4: The method of aspect 3, wherein the set of resources are preconfigured at the UE or dedicated for relay messages, or both.

Aspect 5: The method of any of aspects 3 through 4, wherein the set of resources correspond to a subset of resource blocks of a resource pool configured for the UE.

Aspect 6: The method of any of aspects 3 through 5, wherein the set of resources associated with the relay announcement are in a different resource pool than the resource pool for the relay beacon, a different slot than the relay beacon, or both.

Aspect 7: The method of any of aspects 3 through 6, wherein the set of resources are configured for a plurality of UEs including at least the UE.

Aspect 8: The method of any of aspects 1 through 7, wherein the relay selection criterion is based at least in part on a received power of the relay beacon satisfying a proximity threshold, a proximity of the relay device satisfying a proximity threshold, the proximity of the relay device is determined based at least in part on the relay beacon, or any combination thereof.

Aspect 9: The method of any of aspects 1 through 8, further comprising: decoding the relay beacon based at least in part on an identifier which is common to a plurality of relay devices including the relay device.

Aspect 10: The method of aspect 9, further comprising: receiving, from a base station, one or more sequences associated with the plurality of relay devices, the one or more sequences including at least the sequence.

Aspect 11: The method of any of aspects 1 through 10, further comprising: decoding the relay beacon based at least in part on an identifier or a code associated with relay discovery.

Aspect 12: The method of aspect 11, wherein the identifier is an identifier of the relay device or an identifier associated with relay discovery.

Aspect 13: The method of any of aspects 1 through 12, further comprising: identifying a payload of the relay beacon, wherein the payload comprises an identifier of the relay device.

Aspect 14: The method of any of aspects 1 through 13, further comprising: identifying unified access control information associated with the relay device, wherein the establishing the sidelink connection is based at least in part on the unified access control information.

Aspect 15: The method of aspect 14, wherein the relay announcement includes the unified access control information.

Aspect 16: The method of any of aspects 14 through 15, wherein the sidelink connection is established based at least in part on the UE meeting criteria associated with the unified access control information.

Aspect 17: A method for wireless communications at a relay device, comprising: transmitting a relay beacon using a resource pool; transmitting a relay announcement based at least in part on transmitting the relay beacon; and establishing a sidelink connection with a UE based at least in part on the relay announcement.

Aspect 18: The method of aspect 17, further comprising: receiving, from the UE, a relay discovery request, wherein the transmitting the relay announcement is based at least in part on receiving the relay discovery request.

Aspect 19: The method of any of aspects 17 through 18, further comprising: indicating a set of resources associated with the relay announcement based at least in part on the relay beacon, wherein transmitting the relay announcement comprises transmitting the relay announcement using the set of resources.

Aspect 20: The method of aspect 19, wherein the set of resources are preconfigured for the UE or dedicated for relay messages, or both.

Aspect 21: The method of any of aspects 19 through 20, wherein the set of resources correspond to a subset of resource blocks of a resource pool configured for the UE.

Aspect 22: The method of any of aspects 19 through 21, wherein the set of resources associated with the relay announcement are in a different resource pool than the resource pool for the relay beacon, a different slot than the relay beacon, or both.

Aspect 23: The method of any of aspects 19 through 22, wherein the set of resources are configured for a plurality of UEs including at least the UE.

Aspect 24: The method of any of aspects 17 through 23, further comprising: encoding the relay beacon based at least in part on an identifier which is common to a plurality of relay devices including the relay device.

Aspect 25: The method of aspect 24, wherein the relay beacon is scrambled with the sequence.

Aspect 26: The method of any of aspects 17 through 25, further comprising: scrambling the relay beacon based at least in part on an identifier of the relay device or an identifier associated with relay discovery.

Aspect 27: The method of any of aspects 17 through 26, further comprising: including an identifier of the relay device in a payload of the relay beacon.

Aspect 28: The method of any of aspects 17 through 27, further comprising: indicating unified access control information associated with the relay device to the UE, wherein the establishing the sidelink connection is based at least in part on the unified access control information.

Aspect 29: The method of aspect 28, wherein the relay announcement includes the unified access control information.

Aspect 30: The method of any of aspects 28 through 29, wherein the sidelink connection is established based at least in part on the UE meeting criteria associated with the unified access control information.

Aspect 31: A method for wireless communications at a UE, comprising: identifying a set of candidate relay devices to establish a sidelink connection with the UE; receiving a relay announcement from a relay device based at least in part on a first positioning information for the relay device and a second positioning information for the UE; and establishing the sidelink connection with the relay device based at least in part on the relay announcement.

Aspect 32: The method of aspect 31, further comprising: receiving a relay configuration indicating the set of candidate relay devices.

Aspect 33: The method of aspect 32, wherein the relay configuration is received from a base station or a previous connected relay device.

Aspect 34: The method of any of aspects 32 through 33, wherein the relay configuration includes positioning information for the set of candidate relay devices, including the first positioning information for the relay device.

Aspect 35: The method of any of aspects 32 through 34, wherein the relay configuration includes scheduling information for relay announcements from the set of candidate relay devices, scheduling information for relay beacon signals from the set of candidate relay devices, or both.

Aspect 36: The method of any of aspects 32 through 35, wherein the relay configuration indicates a set of resources associated with the relay announcement, monitoring for the relay announcement comprises monitoring the set of resources associated with the relay announcement.

Aspect 37: The method of any of aspects 31 through 36, further comprising: receiving, from the set of candidate relay devices, one or more indications that candidate relay devices in the set of candidate relay devices are stationary.

Aspect 38: The method of aspect 37, further comprising: determining positioning information for the set of candidate relay devices based at least in part on the one or more indications.

Aspect 39: The method of any of aspects 31 through 38, further comprising: transmitting, to the relay device, a relay discovery request based at least in part on the relay device being within a range of the UE, wherein receiving the relay announcement is based at least in part on transmitting the relay discovery request.

Aspect 40: The method of any of aspects 31 through 39, further comprising: receiving reference signals from the set of candidate relay devices; performing positioning measurements for the set of candidate relay devices based at least in part on receiving the reference signals; and determining positioning information for the set of candidate relay devices based at least in part on the positioning measurements.

Aspect 41: The method of any of aspects 31 through 40, further comprising: identifying a set of resources associated with the relay announcement, wherein receiving the relay announcement comprises monitoring the set of resources associated with the relay announcement.

Aspect 42: The method of aspect 41, wherein the set of resources are preconfigured at the UE or dedicated for relay messages, or both.

Aspect 43: The method of any of aspects 41 through 42, wherein the set of resources correspond to a subset of resource blocks of a resource pool configured for the UE.

Aspect 44: A method for wireless communications at a relay device, comprising: indicating a first positioning information of the relay device to establish a sidelink connection with a UE; transmitting a relay announcement to the UE based at least in part on the first positioning information for the relay device; and establishing the sidelink connection with the UE based at least in part on the relay announcement.

Aspect 45: The method of aspect 44, further comprising: indicating scheduling information for relay announcements from the relay device, scheduling information for relay beacon signals from the relay device, or both.

Aspect 46: The method of any of aspects 44 through 45, wherein the first positioning information includes an indication that the relay device is stationary.

Aspect 47: The method of any of aspects 44 through 46, further comprising: receiving, from the UE, a relay discovery request based at least in part on the relay device being within a range of the UE, wherein the transmitting the relay announcement is based at least in part on receiving the relay discovery request.

Aspect 48: The method of any of aspects 44 through 47, further comprising: identifying a set of resources associated with the relay announcement, wherein transmitting the relay announcement comprises transmitting the relay announcement using the set of resources.

Aspect 49: The method of aspect 48, wherein the set of resources are preconfigured for the UE or dedicated for relay messages, or both.

Aspect 50: The method of any of aspects 48 through 49, wherein the set of resources correspond to a subset of resource blocks of a resource pool configured for the UE.

Aspect 51: A method for wireless communications at a UE, comprising: monitoring a resource pool for a relay broadcast from a relay device according to a passive relay discovery mode; detecting a trigger to switch from the passive relay discovery mode to an active relay discovery mode; periodically transmitting a relay discovery request to the relay device based at least in part on the active relay discovery mode; receiving a relay announcement from the relay device based at least in part on transmitting the relay discovery request; and establishing a sidelink connection with the relay device based at least in part on the relay announcement.

Aspect 52: The method of aspect 51, wherein detecting the trigger comprises: identifying a high priority message is pending communication.

Aspect 53: The method of any of aspects 51 through 52, wherein detecting the trigger comprises: determining a timer associated with the passive relay discovery mode has expired.

Aspect 54: The method of any of aspects 51 through 53, further comprising: receiving, from a base station, an indication to use the passive relay discovery mode or the active relay discovery mode.

Aspect 55: An apparatus for wireless communications at a UE, comprising a processor; memory coupled with the processor; and instructions stored in the memory and executable by the processor to cause the apparatus to perform a method of any of aspects 1 through 16.

Aspect 56: An apparatus for wireless communications at a UE, comprising at least one means for performing a method of any of aspects 1 through 16.

Aspect 57: A non-transitory computer-readable medium storing code for wireless communications at a UE, the code comprising instructions executable by a processor to perform a method of any of aspects 1 through 16.

Aspect 58: An apparatus for wireless communications at a relay device, comprising a processor; memory coupled with the processor; and instructions stored in the memory and executable by the processor to cause the apparatus to perform a method of any of aspects 17 through 30.

Aspect 59: An apparatus for wireless communications at a relay device, comprising at least one means for performing a method of any of aspects 17 through 30.

Aspect 60: A non-transitory computer-readable medium storing code for wireless communications at a relay device, the code comprising instructions executable by a processor to perform a method of any of aspects 17 through 30.

Aspect 61: An apparatus for wireless communications at a UE, comprising a processor; memory coupled with the processor; and instructions stored in the memory and executable by the processor to cause the apparatus to perform a method of any of aspects 31 through 43.

Aspect 62: An apparatus for wireless communications at a UE, comprising at least one means for performing a method of any of aspects 31 through 43.

Aspect 63: A non-transitory computer-readable medium storing code for wireless communications at a UE, the code comprising instructions executable by a processor to perform a method of any of aspects 31 through 43.

Aspect 64: An apparatus for wireless communications at a relay device, comprising a processor; memory coupled with the processor; and instructions stored in the memory and executable by the processor to cause the apparatus to perform a method of any of aspects 44 through 50.

Aspect 65: An apparatus for wireless communications at a relay device, comprising at least one means for performing a method of any of aspects 44 through 50.

Aspect 66: A non-transitory computer-readable medium storing code for wireless communications at a relay device, the code comprising instructions executable by a processor to perform a method of any of aspects 44 through 50.

Aspect 67: An apparatus for wireless communications at a UE, comprising a processor; memory coupled with the processor; and instructions stored in the memory and executable by the processor to cause the apparatus to perform a method of any of aspects 51 through 54.

Aspect 68: An apparatus for wireless communications at a UE, comprising at least one means for performing a method of any of aspects 51 through 54.

Aspect 69: A non-transitory computer-readable medium storing code for wireless communications at a UE, the code comprising instructions executable by a processor to perform a method of any of aspects 51 through 54.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
   a processor;
   memory coupled with the processor; and
   instructions stored in the memory and executable by the processor to cause the apparatus to:
   monitor a resource pool for a relay beacon from a relay device;
   detect the relay beacon in the resource pool;
   transmit, to the relay device, a relay discovery request based at least in part on the relay beacon satisfying a relay selection criterion;
   receive a relay announcement from the relay device based at least in part on the relay beacon satisfying the relay selection criterion and based at least in part on transmitting the relay discovery request; and
   establish a sidelink connection with the relay device based at least in part on the relay announcement.

2. The apparatus of claim 1, wherein:
   the relay selection criterion is based at least in part on a received power of the relay beacon satisfying a proximity threshold, a proximity of the relay device satisfying a proximity threshold, and the proximity of the relay device is determined based at least in part on the relay beacon, or any combination thereof.

3. The apparatus of claim 1, wherein the instructions are further executable by the processor to cause the apparatus to:
   decode the relay beacon based at least in part on an identifier which is common to a plurality of relay devices including the relay device.

4. The apparatus of claim 3, wherein the instructions are further executable by the processor to cause the apparatus to:
   receive, from a network device, one or more sequences associated with the plurality of relay devices.

5. The apparatus of claim 1, wherein the instructions are further executable by the processor to cause the apparatus to:
   decode the relay beacon based at least in part on an identifier or a code associated with relay discovery.

6. The apparatus of claim 5, wherein the identifier is an identifier of the relay device or an identifier associated with relay discovery.

7. The apparatus of claim 1, wherein the instructions are further executable by the processor to cause the apparatus to:
   identify a payload of the relay beacon, wherein the payload comprises an identifier of the relay device.

8. An apparatus for wireless communications at a user equipment (UE), comprising:
   a processor;
   memory coupled with the processor; and
   instructions stored in the memory and executable by the processor to cause the apparatus to:
   monitor a resource pool for a relay beacon from a relay device;
   detect the relay beacon in the resource pool;
   receive a relay announcement from the relay device based at least in part on the relay beacon satisfying a relay selection criterion;
   identify a set of resources associated with the relay announcement based at least in part on the relay beacon from the relay device, wherein receiving the relay announcement comprises monitoring the set of resources associated with the relay announcement; and
   establish a sidelink connection with the relay device based at least in part on the relay announcement.

9. The apparatus of claim 8, wherein the set of resources are preconfigured at the UE or dedicated for relay messages, or both.

10. The apparatus of claim 8, wherein the set of resources correspond to a subset of resource blocks of a resource pool configured for the UE.

11. The apparatus of claim 8, wherein the set of resources associated with the relay announcement are in a different resource pool than the resource pool for the relay beacon, a different slot than the relay beacon, or both.

12. The apparatus of claim 8, wherein the set of resources are configured for a plurality of UEs including at least the UE.

13. An apparatus for wireless communications at a user equipment (UE), comprising:
    a processor;
    memory coupled with the processor; and
    instructions stored in the memory and executable by the processor to cause the apparatus to:
    monitor a resource pool for a relay beacon from a relay device;
    detect the relay beacon in the resource pool;
    receive a relay announcement from the relay device based at least in part on the relay beacon satisfying a relay selection criterion;
    identify unified access control information associated with the relay device; and
    establish a sidelink connection with the relay device based at least in part on the relay announcement and the unified access control information.

14. The apparatus of claim 13, wherein the relay announcement includes the unified access control information.

15. The apparatus of claim 13, wherein the sidelink connection is established based at least in part on the UE meeting criteria associated with the unified access control information.

16. An apparatus for wireless communications at a relay device, comprising:
    a processor;
    memory coupled with the processor; and
    instructions stored in the memory and executable by the processor to cause the apparatus to:
    transmit a relay beacon using a resource pool;
    indicate a set of resources associated with a relay announcement based at least in part on the relay beacon;
    transmit the relay announcement based at least in part on transmitting the relay beacon, wherein transmitting the relay announcement comprises transmitting the relay announcement using the set of resources; and establish a sidelink connection with a user equipment (UE) based at least in part on the relay announcement.

17. The apparatus of claim 16, wherein the instructions are further executable by the processor to cause the apparatus to:

receive, from the UE, a relay discovery request, wherein the transmitting the relay announcement is based at least in part on receiving the relay discovery request.

18. The apparatus of claim 16, wherein the set of resources are preconfigured for the UE or dedicated for relay messages, or both.

19. The apparatus of claim 16, wherein the set of resources correspond to a subset of resource blocks of a resource pool configured for the UE.

20. The apparatus of claim 16, wherein the set of resources associated with the relay announcement are in a different resource pool than the resource pool for the relay beacon, a different slot than the relay beacon, or both.

21. The apparatus of claim 16, wherein the set of resources are configured for a plurality of UEs including at least the UE.

22. The apparatus of claim 16, wherein the instructions are further executable by the processor to cause the apparatus to:

encode the relay beacon based at least in part on an identifier which is common to a plurality of relay devices including the relay device.

23. The apparatus of claim 16, wherein the relay beacon is scrambled with a sequence associated with the relay device.

24. A method for wireless communications at a user equipment (UE), comprising:

monitoring a resource pool for a relay beacon from a relay device;

detecting the relay beacon in the resource pool;

transmitting, to the relay device, a relay discovery request based at least in part on the relay beacon satisfying a relay selection criterion;

receiving a relay announcement from the relay device based at least in part on the relay beacon satisfying the relay selection criterion and based at least in part on transmitting the relay discovery request; and establishing a sidelink connection with the relay device based at least in part on the relay announcement.

25. A method for wireless communications at a user equipment (UE), comprising:

monitoring a resource pool for a relay beacon from a relay device;

detecting the relay beacon in the resource pool;

receiving a relay announcement from the relay device based at least in part on the relay beacon satisfying a relay selection criterion;

identifying a set of resources associated with the relay announcement based at least in part on the relay beacon from the relay device, wherein receiving the relay announcement comprises monitoring the set of resources associated with the relay announcement; and establishing a sidelink connection with the relay device based at least in part on the relay announcement.

26. The method of claim 25, wherein the set of resources are preconfigured at the UE or dedicated for relay messages, or both.

27. A method for wireless communications at a relay device, comprising:

transmitting a relay beacon using a resource pool;

indicating a set of resources associated with a relay announcement based at least in part on the relay beacon;

transmitting qathe relay announcement based at least in part on transmitting the relay beacon, wherein transmitting the relay announcement comprises transmitting the relay announcement using the set of resources; and establishing a sidelink connection with a user equipment (UE) based at least in part on the relay announcement.

* * * * *